US008171410B2

(12) United States Patent
Falchuk

(10) Patent No.: US 8,171,410 B2
(45) Date of Patent: May 1, 2012

(54) METHOD AND SYSTEM FOR GENERATING AND PRESENTING MOBILE CONTENT SUMMARIZATION

(75) Inventor: Benjamin W. Falchuk, Upper Nyack, NY (US)

(73) Assignee: Telcordia Technologies, Inc., Piscataway, NJ (US)

( * ) Notice: Subject to any disclaimer, the term of this patent is extended or adjusted under 35 U.S.C. 154(b) by 595 days.

(21) Appl. No.: 12/474,760

(22) Filed: May 29, 2009

(65) Prior Publication Data
US 2009/0300498 A1    Dec. 3, 2009

Related U.S. Application Data

(60) Provisional application No. 61/057,004, filed on May 29, 2008.

(51) Int. Cl.
G06F 3/00 (2006.01)
(52) U.S. Cl. .................... 715/719; 715/704; 715/723
(58) Field of Classification Search .................. 715/719, 715/704, 723
See application file for complete search history.

(56) References Cited

U.S. PATENT DOCUMENTS

| | | | |
|---|---|---|---|
| 5,495,562 A | 2/1996 | Denney et al. | |
| 5,664,227 A | 9/1997 | Mauldin et al. | |
| 5,852,435 A | 12/1998 | Vigneaux et al. | |
| 5,890,152 A | 3/1999 | Rapaport et al. | |
| 6,069,606 A | 5/2000 | Sciammarella et al. | |
| 6,281,898 B1 | 8/2001 | Nikolovska et al. | |
| 6,332,147 B1 | 12/2001 | Moran et al. | |
| 6,526,219 B1 | 2/2003 | Posa et al. | |
| 6,574,416 B1 | 6/2003 | Posa et al. | |
| RE38,401 E | 1/2004 | Goldberg et al. | |
| RE38,609 E | 10/2004 | Chen et al. | |
| 6,807,361 B1 | 10/2004 | Girgensohn et al. | |
| 6,977,659 B2 | 12/2005 | Dumitras et al. | |
| 7,149,974 B2 | 12/2006 | Girgensohn et al. | |
| 7,155,676 B2 * | 12/2006 | Land et al. ................. | 715/731 |
| 7,194,527 B2 | 3/2007 | Drucker et al. | |
| 7,246,322 B2 | 7/2007 | Neely et al. | |
| 7,274,741 B2 | 9/2007 | Ma et al. | |
| 7,437,005 B2 | 10/2008 | Drucker et al. | |
| 7,483,618 B1 | 1/2009 | Edwards et al. | |

(Continued)

OTHER PUBLICATIONS

S.W. Smoliar, et al., "Content Based Video Indexing and Retrieval," IEEE Multimedia, vol. 1, Issue 2 pp. 62-72, Summer 1994.

(Continued)

*Primary Examiner* — Weilun Lo
*Assistant Examiner* — Shashi Becker
(74) *Attorney, Agent, or Firm* — Philip J. Feig

(57) ABSTRACT

This invention involves a system and method to construct a visual representation of multidimensional data that works especially well for video. The system comprises an application on a mobile device having a screen, an assignment module assigning the media segments to the screen, a rendering module rendering the assigned media segments on the screen, a playback module playing the assigned media segments, a catalog module representing media metadata about the mobile content, a summarization module stewarding the media metadata, and a remote server storing the mobile content and the media metadata. The application retrieves the mobile content from the remote server and accesses the assignment, the rendering, the playback, the catalog, and the summarization modules. The system also comprises a method to log and analyze the browsing interactions of one or more users, and present a view of the media that reflects what is interesting to the user.

16 Claims, 23 Drawing Sheets

U.S. PATENT DOCUMENTS

| | | | |
|---|---|---|---|
| 7,539,659 B2 * | 5/2009 | Wong et al. | 706/62 |
| 7,559,039 B2 | 7/2009 | Ridgley et al. | |
| 7,664,775 B2 | 2/2010 | Reed et al. | |
| 7,689,525 B2 | 3/2010 | Drucker et al. | |
| 7,769,832 B2 | 8/2010 | Drucker et al. | |
| 7,806,767 B2 | 10/2010 | Kitao | |
| 7,877,707 B2 | 1/2011 | Westerman et al. | |
| 7,956,848 B2 | 6/2011 | Chaudhri | |
| 8,046,453 B2 * | 10/2011 | Olaiya | 709/224 |
| 2003/0235341 A1 * | 12/2003 | Gokturk et al. | 382/243 |
| 2005/0097135 A1 | 5/2005 | Epperson et al. | |
| 2005/0120053 A1 | 6/2005 | Watson | |
| 2005/0123053 A1 * | 6/2005 | Cooper et al. | 375/240.24 |
| 2005/0192924 A1 | 9/2005 | Drucker et al. | |
| 2005/0212716 A1 * | 9/2005 | Feigel et al. | 345/1.1 |
| 2006/0197753 A1 | 9/2006 | Hotelling | |
| 2007/0011603 A1 | 1/2007 | Makela | |
| 2007/0027839 A1 | 2/2007 | Ives | |
| 2007/0061247 A1 | 3/2007 | Ramer et al. | |
| 2007/0073718 A1 | 3/2007 | Ramer et al. | |
| 2007/0106760 A1 * | 5/2007 | Houh et al. | 709/219 |
| 2007/0118873 A1 * | 5/2007 | Houh et al. | 725/136 |
| 2007/0121015 A1 | 5/2007 | Gu et al. | |
| 2007/0220575 A1 | 9/2007 | Cooper et al. | |
| 2007/0250901 A1 | 10/2007 | McIntire et al. | |
| 2007/0288470 A1 * | 12/2007 | Kauniskangas et al. | 707/10 |
| 2008/0088602 A1 | 4/2008 | Hotelling | |
| 2008/0092168 A1 | 4/2008 | Logan et al. | |
| 2008/0122796 A1 | 5/2008 | Jobs et al. | |
| 2008/0298643 A1 | 12/2008 | Lawther et al. | |
| 2008/0313127 A1 * | 12/2008 | Wong et al. | 706/61 |
| 2009/0058822 A1 | 3/2009 | Chaudhri | |
| 2009/0083412 A1 * | 3/2009 | Olaiya | 709/224 |
| 2009/0093278 A1 * | 4/2009 | Negron et al. | 455/567 |
| 2009/0164904 A1 * | 6/2009 | Horowitz et al. | 715/723 |
| 2009/0226044 A1 | 9/2009 | Ngan et al. | |
| 2009/0289937 A1 | 11/2009 | Flake et al. | |
| 2010/0145794 A1 | 6/2010 | Barger et al. | |

OTHER PUBLICATIONS

B. Falchuk, et al., "A Tool for Video Content Understanding on Mobile Smartphones," Proc. 10th ACM Int'l. Conf. on Human-Computer Interaction with Mobile Devices and Services (MobileHCI 2008) Amsterdam, 2008.

J. A. Hartigan, et al., "A K-Means Clustering Algorithm," Journal of the Royal Statistical Society, vol. 27, pp. 100-108, 1978.

International Search Report dated Nov. 17, 2009.

* cited by examiner

METHOD AND SYSTEM FOR GENERATING AND PRESENTING MOBILE CONTENT SUMMARIZATION

CROSS REFERENCE TO RELATED APPLICATIONS

The present invention claims the benefit of U.S. provisional patent application 61/057,004 filed May 29, 2008, the entire contents and disclosure of which are incorporated herein by reference as if fully set forth herein.

This application is related to the following commonly-owned, co-pending United States Patent Application filed on even date herewith, the entire contents and disclosure of which is expressly incorporated by reference herein as if fully set forth herein. U.S. patent application Ser. No. (APP 1846), for "METHOD AND SYSTEM FOR MULTI-TOUCH-BASED BROWSING OF MEDIA SUMMARIZATIONS ON A HANDHELD DEVICE".

FIELD OF THE INVENTION

The present invention relates generally to visual representation of multidimensional data.

BACKGROUND OF THE INVENTION

In a very short time period, YouTube has become one of the biggest video databases in the world. Featuring millions of videos, each one about 9 Mbytes big and several minutes long, thousands of new videos are uploaded each day. While YouTube user-generated videos are often short—minutes, not hours—iTunes, MSN, and Google Video offer short, episodic, and full length content. Other types of media with temporal dimension are also prevalent: for example, slideshows, music, annotated music, sequenced images, and so on. All these media are more and more accessed via the mobile Web browser or via mobile applications installed on the mobile device. Most mobile Web sites and applications, however, offer very poor and limited tools for content-understanding, that is, tools to help customers quickly understand the gist or substance of the content, especially video, they are interested in.

"Content understanding" means the act of browsing through content in order to create a mental model of it to some sufficient degree. The user's sufficiency requirements may hinge on their ability to determine specific details such as: "Is a goal scored in the first 10 minutes of this football video?", "Does the video have a scene in which two men fight onboard a helicopter?", "Does the video have a scene in which a cat falls off a ledge after a baby scares it?". The above types of questions are almost impossible to be resolved on today's Web-centric media sharing sites such as Yahoo!®, Google™ and YouTube. Thus the benefits of content-based browsing—especially with respect to video—are clear in cases where media content complexity is anything more complicated than "trivial".

There are few effective tools for video content non-linear browsing and understanding on mobile devices. For example, FIG. 1 depicts YouTube on a mobile handset. YouTube.com does not provide informative "preview" information for videos apart from a few video keyframes. Content-understanding comes only from the keyframe, the video duration (e.g. 03:52 min), and the aggregated "user tags" created by the community. Complex content cannot be inferred (e.g., "is this the one where the guy on the sled hits the other guy after going over a ramp?").

YouTube's Warp tool shows the relationships between videos in a graphical way, but not fine-grain details of the content within a given video. YouTube's Java application for smartphones only previews content from a single keyframe. MotionBox.com and other similar sites use the prevalent technique of showing a static keyframe strip below the movie. Guba.com employs a 4×4 matrix of keyframes for any given video, but the representation is non-navigable. Internet Archive Website lays out one keyframe for each minute of a video in question, to allow a somewhat weak or diluted view of the video content. Finally, note that the current art also enables a limited video understanding through "tags" but that the tag paradigm (also known as "folksonomy") has several drawbacks including: weak semantics, low scalability, lack of hierarchy. These drawbacks make it unsuitable for deep video content understanding.

BRIEF SUMMARY OF THE INVENTION

The inventive system is a compact and highly effective way for users to quickly, systematically, and non-linearly browse media (especially video) content in order to make a "watch/no-watch", "rent/no-rent", and/or "download/no-download" decision. This inventive system can run upon the smartphone or any other mobile device. A data connection (cellular, Wi-Fi) can be used to access a media catalog (such as a video storefront for video selection). An associated media server may serve metadata and key segment (e.g., video keyframes) to the smartphone on demand, allowing the rendering of a compact, customized, pixel-efficient visual notation. As browsing operations are performed by a user upon this rendering, auditing and logging may occur, e.g, for billing or profiling purposes. In one embodiment, a mediation server could sit in-between the mobile user and the content provider, providing the content understanding information to the components running on the mobile device and auditing and billing. The summarization information could be deployed in a "hosted" mode in an application server.

The inventive system for generating and presenting summarization of mobile content having a plurality of media segments comprises an application on a mobile device having a screen, an assignment module assigning one or more of the media segments to one or more parts of the screen, a rendering module rendering the assigned media segments on the parts of the screen, a playback module playing back the assigned media segments in various qualities, a catalog module representing media metadata about the mobile content, a summarization module stewarding the media metadata, and a remote server storing the mobile content and the media metadata, wherein the application retrieves the mobile content from the remote server and accesses the assignment module, the rendering module, the playback module, the catalog module and the summarization module.

The main use cases enabled by the inventive application include the following. One use case lets mobile users choose media to browse from their mobile device, such that media are represented in a fashion that highlights their interesting regions to the users in a customized and effective way. Another use case lets mobile users browse temporal media in a highly pixel-efficient manner that also maintains and renders the notions of temporal "focus" and "range", allowing a highly non-linear browse mechanism. Another use case lets mobile users browse media interactively on their cellphone in a lightweight way that does not compromise the original media. Yet another use case lets mobile users playback media in a way that does not compromise original media. Still another use case lets mobile users mark and see community hotspots within media.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

The inventive system or tool runs on a smartphone, presents video content to the user, and allows interactive browsing for the purpose of content-understanding. The following assumptions are made: 1) a backend video repository provides media (e.g. keyframes, metadata, etc.) to the tool, 2) the smartphone has a reasonably sized screen that allows the rendering of graphics, 3) the content in question has a temporal dimension and a visual content dimension (e.g. video, surveillance, medical imagery, etc.), and is sufficiently complex or lengthy that simply fast-forwarding through it is not an effective way for a user to build a mental model of it.

Figure 1:
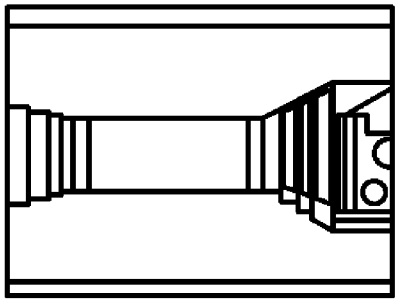
FIG. 1 depicts YouTube on a mobile handset.
Figure 2:
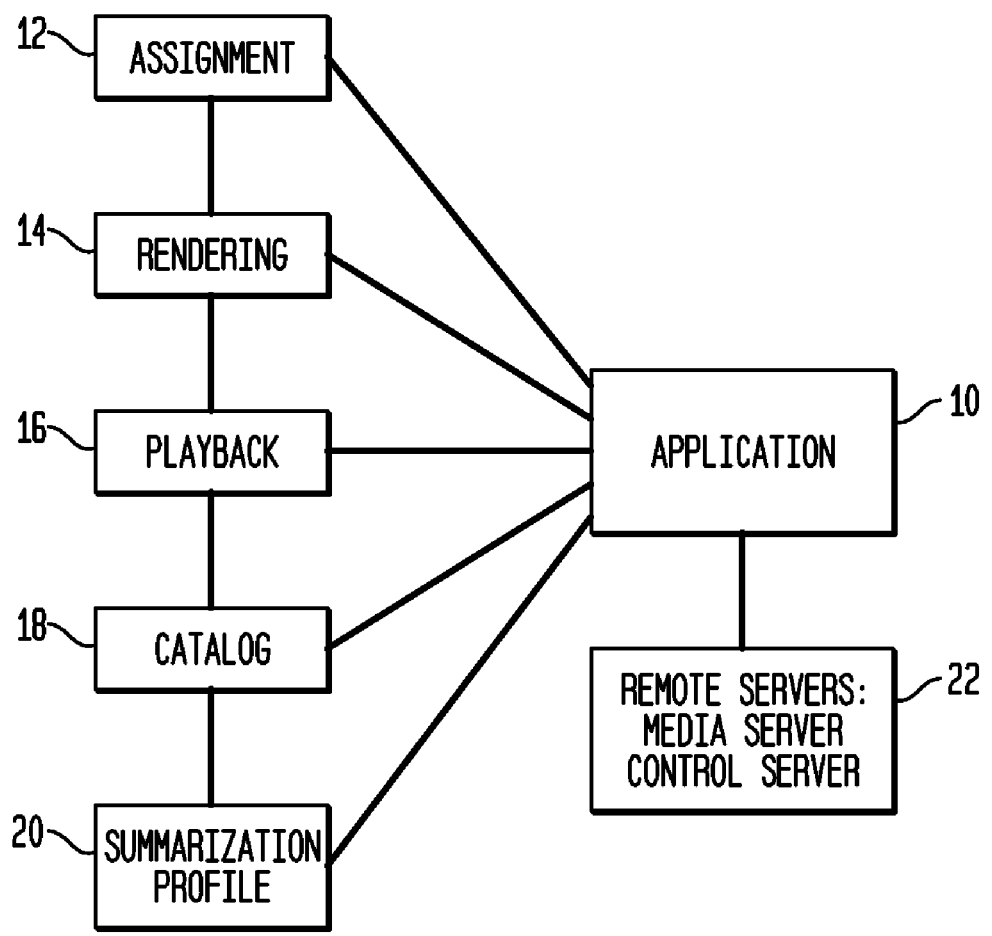
FIG. 2 shows components of the invention.

FIG. 2 depicts the components of the system. The Application 10 is the main application that obtains input from both the user (interactions) and from the server and uses an appropriate module in response.

The Assignment component 12 assigns media segments to parts of the screen depending on the media type, an optional preferred assignment mode, and other parameters. Assignment 12 chooses the subset of individual media (e.g., video frames) that should be displayed on the interface. In one embodiment, Assignment 12 is based on choosing media units so that they are sampled in a temporal equal pattern from the user's current preferred range of view (e.g. n units every t time units), centered around the user's current preferred temporal focus. Other modes are possible such as focusing assignment on semantically "important" units such as, but not limited to, scene transitions, or camera cuts, or by focusing on segments of the media previously identified as more interesting to a given user or community.

The Rendering component 14 draws the overall imagery according to an assignment pattern gained from Assignment component 12. Rendering 14 renders media segments onto the mobile device's screen. The Rendering mode 14 might be a function of the user, the media type, or some other local or global policy. Rendering component 14 maps an assignment of a layout to a rendering of the layout on the pixelspace of the screen. In one embodiment, a pixel-efficient "ring"-type rendering scheme would render the media segments identified in Assignment 12 onto the layout pattern contained in Rendering 14, consisting of a central rectangular focal segment on the screen which is has several rings of smaller rectangles rendered around its perimeter until the outer edge of the screen is reached.

The Playback component 16 handles the playback of media and also the granularity or other obfuscation techniques depending on the attributes of this user, media, or session. Playback 16 preloads, caches and plays-back segments of the media back to the user. Playback 16 may be performed using the same media segments provided for the browsing views or may communicate with a networked server, enabling playing of a "full" version of the content streamed over the network, or downloaded in full. In the case where the video content owner does not want to compromise or risk theft or re-use of video, the Playback component 16 can be configured to emulate a playback by, for example, presenting the media segments in the current range of view in rapid fashion on the device. Alternatively, the Playback component 16 might use a full version of the media in question for playback but apply "blurring" or visually obscuring the content or might change the sampling rate of the content so as to markedly reduce quality and protect original high-quality content.

The Catalog component 18 is a representation of some of the media metadata available to a particular user, including the media currently being browsed. Catalog 18 includes metadata about the media available to this user, including community hotspots and user hotspots. This metadata can be loaded from a server or from a local cache on the device. The Catalog 18 is accessed by other components of the invention, and contains a series of entries of metadata describing media available to the user. The Catalog 18 can be downloaded in whole or in part from a remote server 20 and stored in memory on the device. For each media available to the user, the Catalog 18 lists important related information: the ID, the index for listing purposes, URL's to where the media and related data (such as reset view icons and other related icons) reside remotely, descriptors, community hotspots (e.g. each of which is comprised of a focus area and range), available rendering, quality and playback modes for this media, and an "interest index" corresponding to how interesting the server thinks the user will find this media. Accordingly, attributes and information stored by the Catalog 18 can include: media ID, local index, media server links, media resetview link, number of units, list of media descriptors, list of community hotspots, available visual render modes, available playback modes, available qualities, interest estimation for user. Catalog entries are generated with respect to the user requesting them, so that not every user sees the same metadata for a given media. Available rendering modes might include: single shot browsing, "ring" mode, standard thumbnail mode, etc. A rendering mode is interpreted by both the Assignment 12 and Rendering 14 components.

Remote Servers 20 include a Media Server role and a Control Server role. The Media Server role stores media, media metadata, and media segments for access by the inventive application. The Control Server role stores rules and Business logic and is used by the application in support of various use cases of the inventive application. The servers are networked to the wireless device running the application and can be implemented on a single server or distributed.

The Summarization profile component 22 stewards the metadata and global browsing constraints and characteristics of this user. Summarization profile 22 includes the constraints affecting the browsing experience of a given media for a given user. The Summarization profile 22, like the Catalog 18, is accessed by other components of the invention. The Summarization profile 22, among other things, encodes the constraints and media browsing limitations that should be imposed on the user at a global level (e.g. that apply whenever the user is browsing). These might include issues related to: the allowable visual quality that is seen by the user, the level of advertisement that is inserted into sessions, the sort of playback modes allowed for this user, and others. Summarization profile 22 also encodes the user's IF), the user's browse history with a given media, the user's account balance and the user's hotspots within the given media. Information in the Summarization profile 22 can include: user account balance (credits, dollar amounts, etc.), user media history, user key/ID, user hotspots, user session browse trace, user visual render constraints, user quality constraints, user playback constraints.

In the case that there are several representation and browsing options available to users for a given media and there is only one option available in the user's Summarization profile 22, then the latter will take precedence. This could be the case, for example, if there are low, medium, and high quality playback modes available for a media (and listed in the Catalog 18) but for business or accounting reasons the user is only allowed to use the low quality playback (which is the only option available in her profile).

Figure 3:
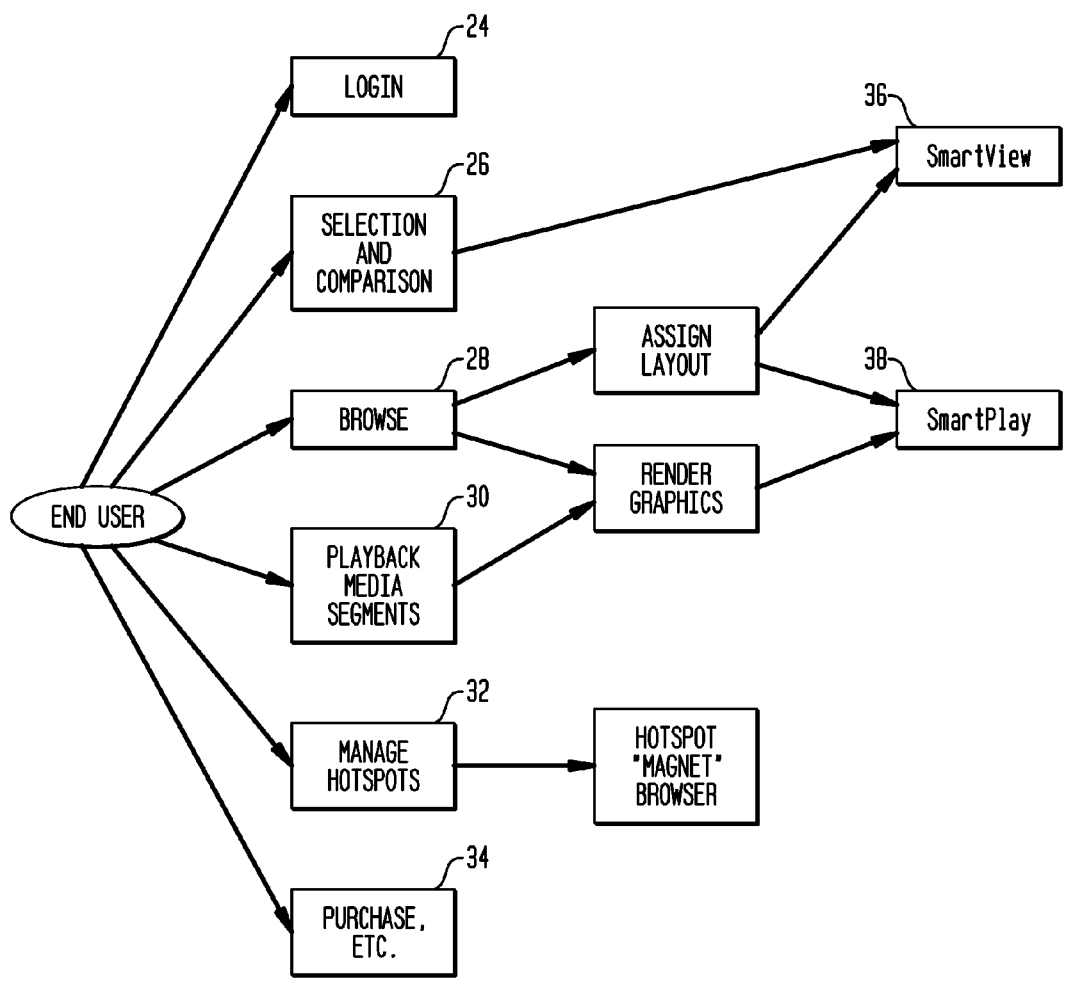
FIG. 3 shows main case uses of the invention.

High level use cases of the inventive tool are shown in FIG. 3. Once initialized, the invention is largely triggered by end user interaction with it. Generally, in response to the user, the invention makes a reassignment 12 to the visual content on the mobile device screen and re-renders it 14. Thus, assigning media and visual components to areas of the mobile screen according to an algorithm, and rendering those visual components as renderable graphics, are two key functions of the invention and are functionally provided by Rendering 14 and Assignment 12 components.

As depicted in FIG. 3, the end user drives the invention algorithms and procedures by interacting with the visual part of the invention (the application) using some input mechanism which includes—but is not limited to—keypad, touchscreen, stylus, brain-computer interface. The main use cases are: logging in 24, selection and comparison 26, browse 28, playback media segments 30, manage hotspots 32, "purchase" 34 including purchase, rent, e-commerce, etc., SmartView 36 and SmartPlay 38.

Logging in 24 uses the application to sign in to the server (using an ID and password). The login serves as the gateway into further interactions. Current practices (such as cookies) may be used to maintain a session between the device and the logged-in actions incurred on the server.

Selection and comparison 26 enables presentation of an intuitive visual representation of various media in a side by side fashion on the smartphone or mobile screen. This allows the user to browse and compare media at a high level and choose which ones she'd like to "explore".

During Browse 28 or in a browsing session of a media, the invention continually reacts to user input, reassigns media segments, talks to backend servers and local components, and re-renders information on the screen according to Assignment 12.

Manage hotspots 32 includes the invention's capability to let the user store and manage spots of interest in the media and to see and browse hotspots created by a community of users.

Purchase 34 includes the ability of the invention to convey to an e-commerce system the details of what aspects of the media are being examined by the user, such as for purchase, as well as past browsing activity.

SmartView 36 provides the ability of the system to generate a small and dense visual representation of a given temporal media, e.g., Video. This view may be customized to the users interests. SmartView 36 also refers to the ability to display an initial browsing view that rests on the most key part of the media (relative to this particular user).

SmartPlay 38 provides the ability of the invention to accept parameter modifications during playback such that the user's media playback experience changes dynamically, e.g. becomes less pixilated, becomes lower quality. SmartPlay 38 can include Block, "Blur", "Pixelate", Insert (or remove) advertisements (ads), and Replace units.

Figure 4:
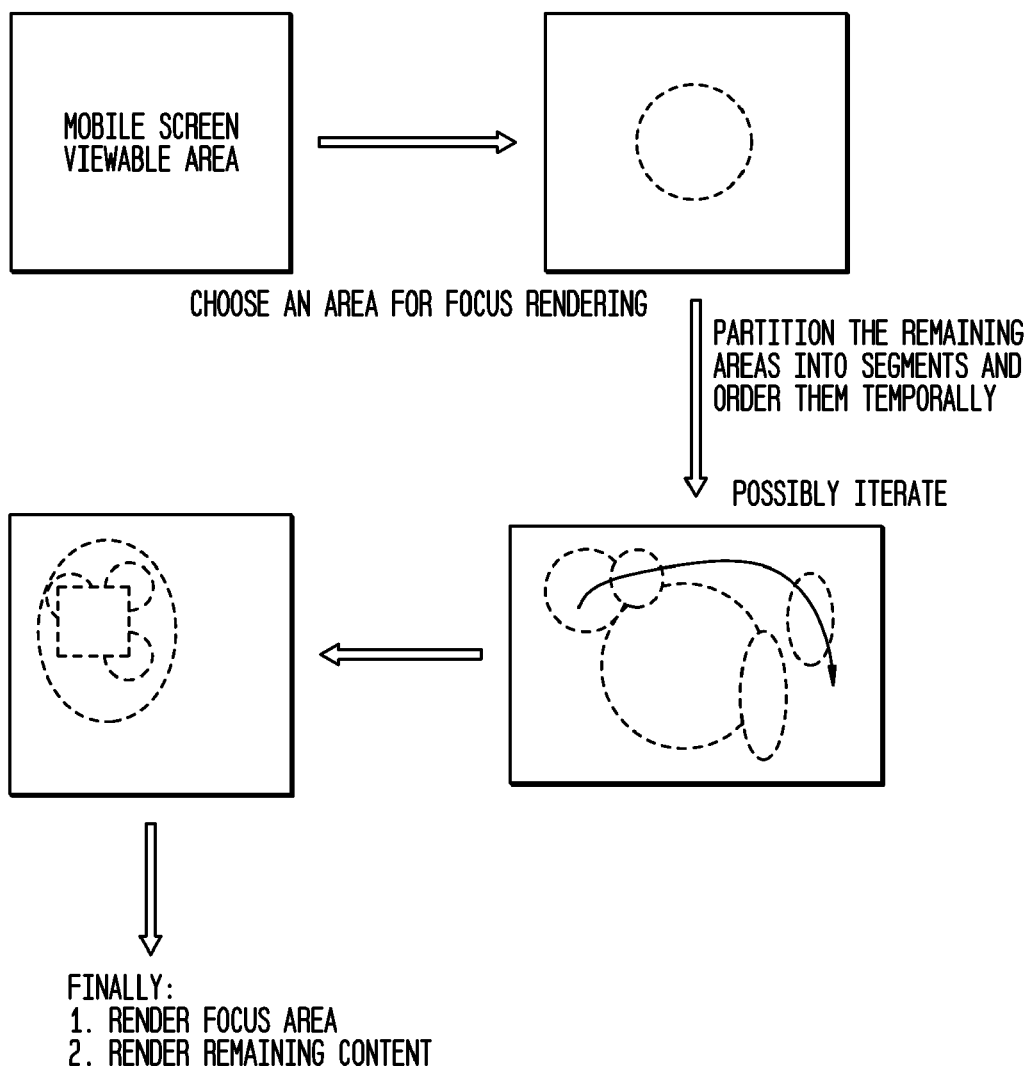
FIG. 4 shows an exemplary key rendering approach.

FIG. 4 illustrates a main function of the Assignment 12 and Rendering 14 components. Initially, a mobile screen viewable area exists. One area for "focus" rendering is chosen. The remaining areas are partitioned into segments and ordered temporally. The selection and partitioning may be repeated or iterated. Finally, the focus area with the most number of pixels, resolution, detail and so on, or with the most relevant data to the user at any moment is rendered. Also, the remaining content in the view is rendered by laying it out in the understood rendering pattern. Accordingly, the segments in the rings can be temporally ordered from the top-left and sampled equally from the current range; the sampling, however, can use any algorithm. The center keyframe is called the "focus" and the view range is the portion of the video surrounding the focus frame that is currently under scrutiny. The range of content currently displayed can be understood by scanning the keyframes clockwise from the top-left, or in some other pre-arranged ordering. Thus the central area of the display is the "focus" area, or area of detail. The outer areas of the display are context, or peripheral information; although this area shows less detail, it reveals other aspects of the content, e.g., temporal relationships. There is a temporal relationship between all the components that can be implicitly inferred by the viewer.

In one particularly important assignment mode, the Assignment component 12 divides the mobile screen into a central region and periphery regions. In the central region, Assignment 12 always assigns something of high relevancy or interest at the given moment, for example, the current focus of the browsing session, e.g., one video frame. Around the central region, the Assignment component 12 divides up the remaining space into segments that have a temporal relationship to adjacent abutting segments. For example, it might order these segments such that from the top-left and reading clockwise the segments are temporally ordered, each one from a region later in time than the previous. The result is seen in the handheld screenshots shown in FIGS. 19-21. Thus at any given moment, the visual view presented to the user corresponds to a particular subview of the media in question and shows not only a focus area but also contextual periphery information whose segments are sampled from regions both temporally before and after the temporal place of the focus. In addition, Assignment 12 may iteratively subdivide the regions of the mobile screen and perform these operations several times, e.g., on an iterative basis. The Rendering component 14 paints the imagery on the screen where it was assigned.

Once Assignment is determined, rendering functionality could occur on a server side. In such a variant, the server would generate the imagery according to Assignment 12 rules and user and device attributes transmitted to it, and respond with the imagery to the mobile application for display. In this way the number of network connections from application to server may be reduced, that is, instead of the application requesting each of the small visual components that comprise an individual browsing screen in a session, the application requests the whole screen or several "large" segments of it. Another advantage is in cases where computing and I/O are severely limited on the mobile device, a networked server may perform this Rendering 14 more efficiently than the device.

Key Use Cases and Invention Operation

Figure 5:
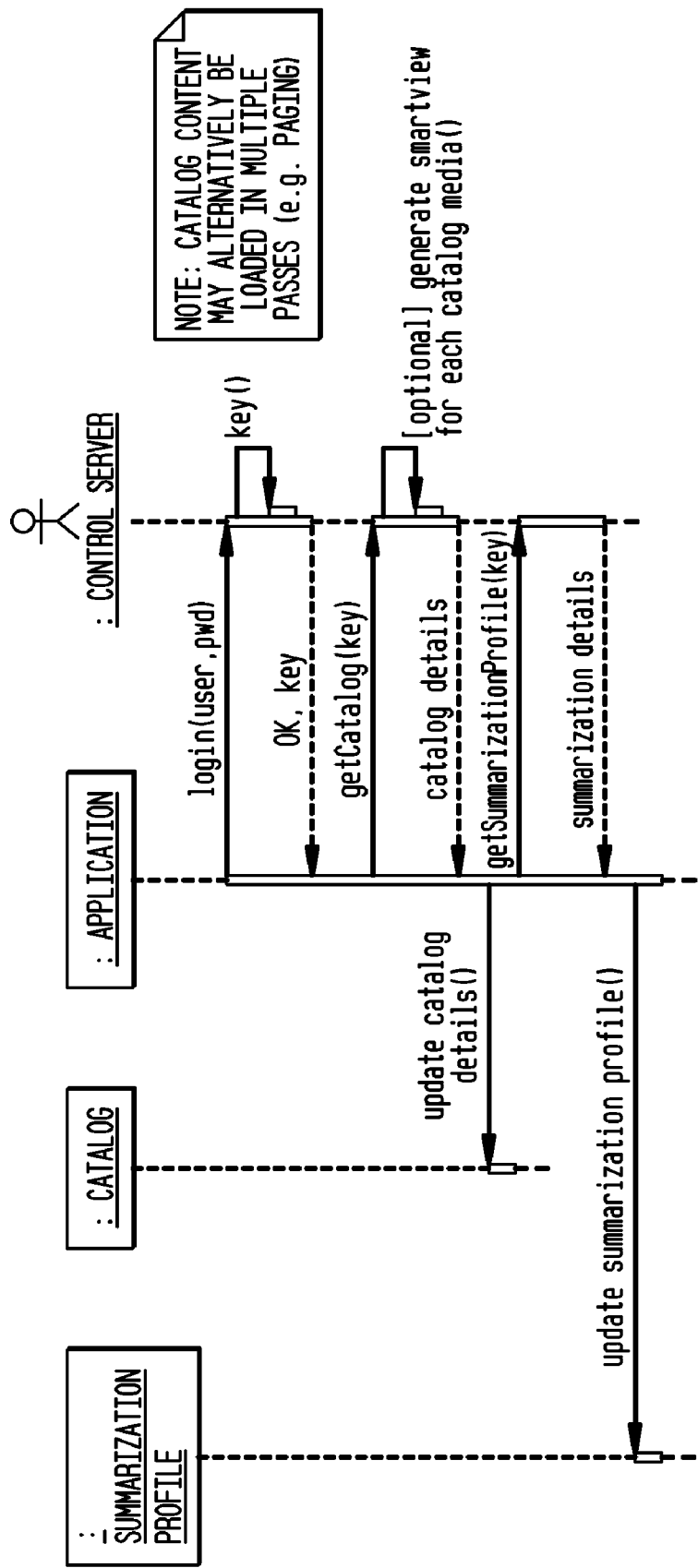
FIG. 5 shows the login procedure in an exemplary embodiment.

FIG. 5 shows the login procedure in an exemplary embodiment. After supplying login ID and password, the application receives a key from the control server. The key is used in subsequent operations, has an expiration, and serves as an identifier of this user and this session. The application then asks the remote server for the catalog information for this user. The server responds with the details of the media catalog that have optionally been customized for this user. The application requests summarization information for this user. The server responds with the detailed summarization information it has stored. The application updates and/or passes this information to local components.

In one embodiment, catalog content may be a large dataset, and so may be transmitted in multiple requests, in partial form, e.g., only relevant entries, or in any other bandwidth-saving technique.

Figure 6:
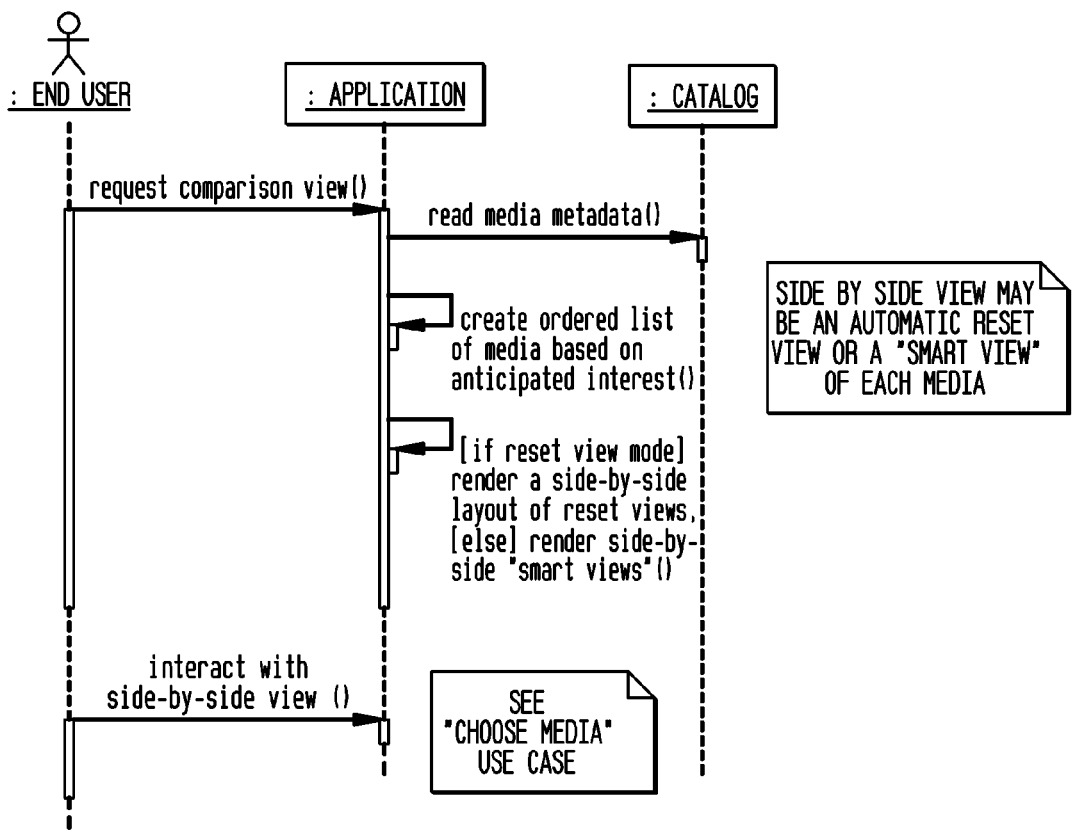
FIG. 6 shows a media comparison use case.

A media comparison use case is shown in FIG. 6. A key aspect of the invention is the media selection opportunity. While media segments may be stored remotely or locally, the invention provides assistance to the user in selecting which media to browse. It does this by presenting a series of graphical media representations, side by side to the extent possible on the device screen to allow user comparison. Each of the individual representations stands for a single media, e.g., a tv show, movie, etc., and each is generated by the application or a component of the application on a server. Optionally, each is generated to focus on a given temporal region of the media that the application deems is important to the user. Thus the user is presented the "best" or "most attractive" view of the media based on her profile or other details that may include considering what the community finds interesting within the media. In one embodiment, the media tiles are shown side by side as in FIG. 7.

Figure 7:
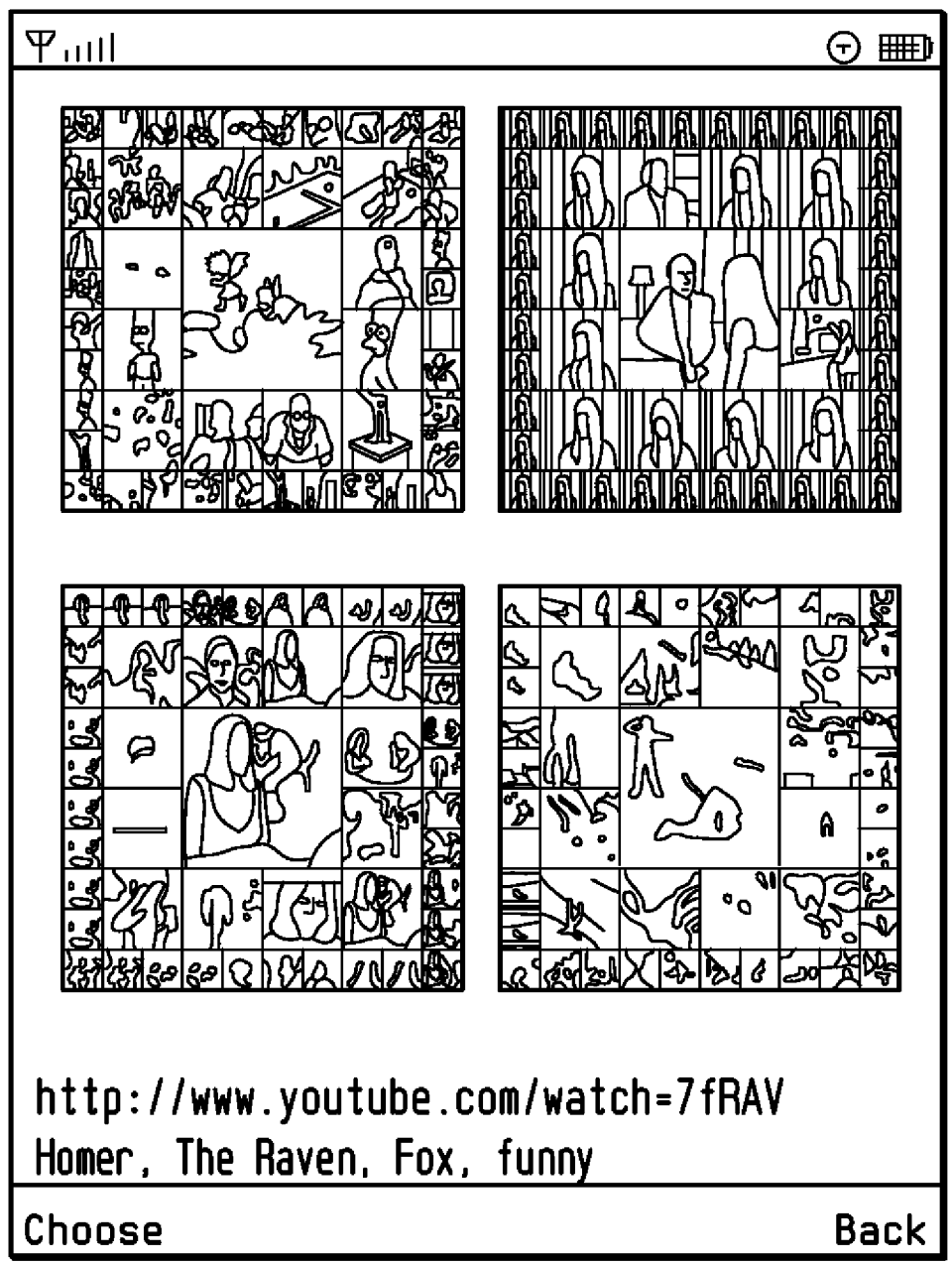
FIG. 7 shows side by side media tiles in an exemplary embodiment.

The user chooses the media of interest. For example, FIG. 7 shows four media from which to choose. Each of these SmartView icons is optionally tailored to this user, to show what is most relevant to her. Relevancy level to a user can be increased in any number of ways that include—but are not limited to—focussing on the temporal center of the media, focussing on the part that has most community interest, focussing on the part whose content is likely to be of interest to the user, focussing on an area that received the most clicks from the user's past browsing sessions with the media, focussing on the part with—but not limited to—particular preferred colors, shapes, contrasts, and so on. The application 10 or remote Servers 22 can provide the analysis that shapes the SmartView 36 construction for a given user.

In one embodiment, the SmartView 36 algorithm described below can be used to create each of the icons in the visual catalog shown in FIG. 7. A scroll option can be provided to enable scrolling through many multiple representations. Once the user has used this view to choose a media, it is loaded and a browsing session begins.

Figure 8:
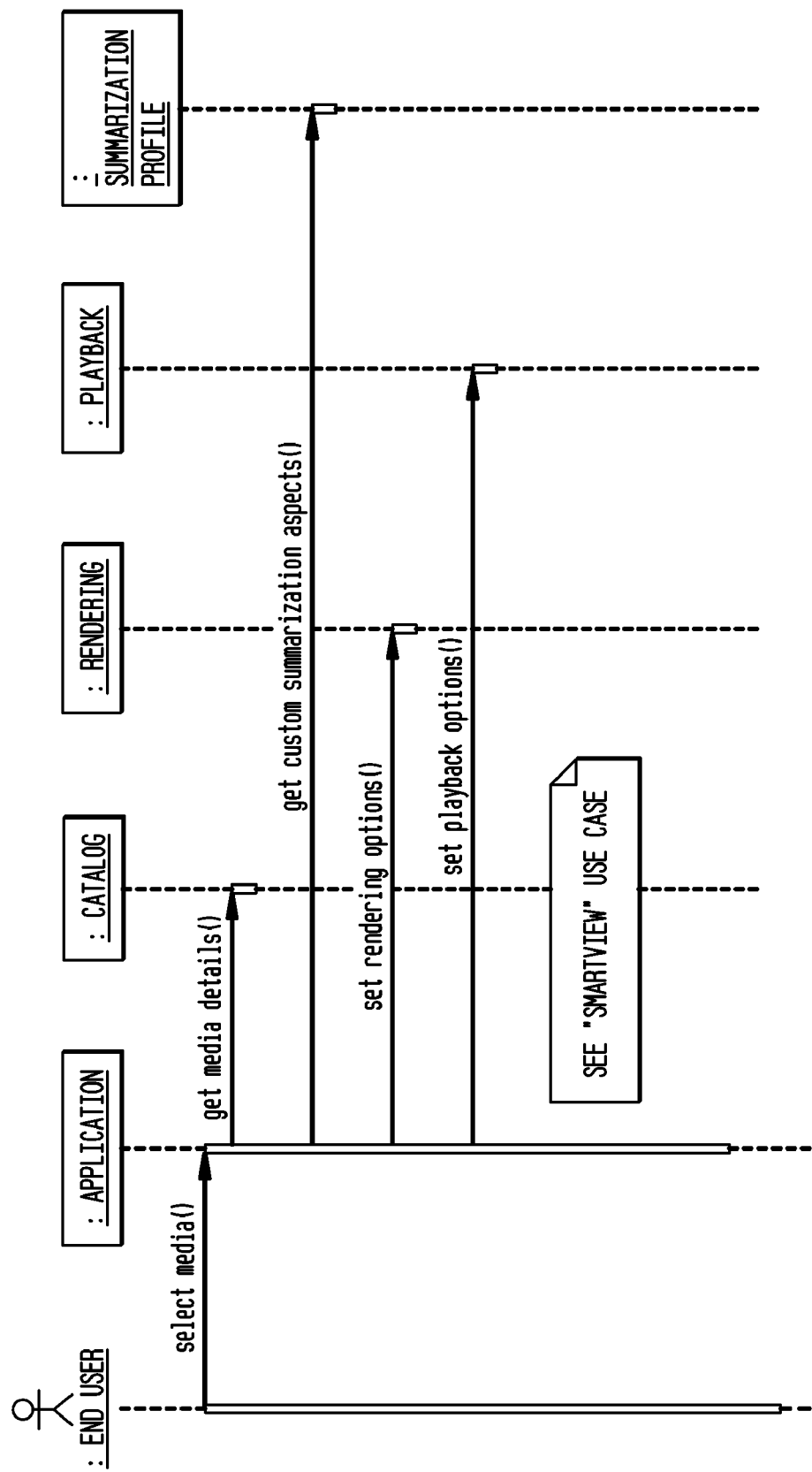
FIG. 8 shows the initial view use case.

The initial view use case proceeds as shown in FIG. 8. Once a media is selected by a user from the Catalog 18 for a browsing session, the application 10 reads the summarization aspects allowable for this media from Summarization Profile 20, sets rendering options via the Rendering component 14, and sets playback constraints via the Playback component 16. Following this, an initial view of the media is presented to the user and the browsing session may begin.

Figure 9:
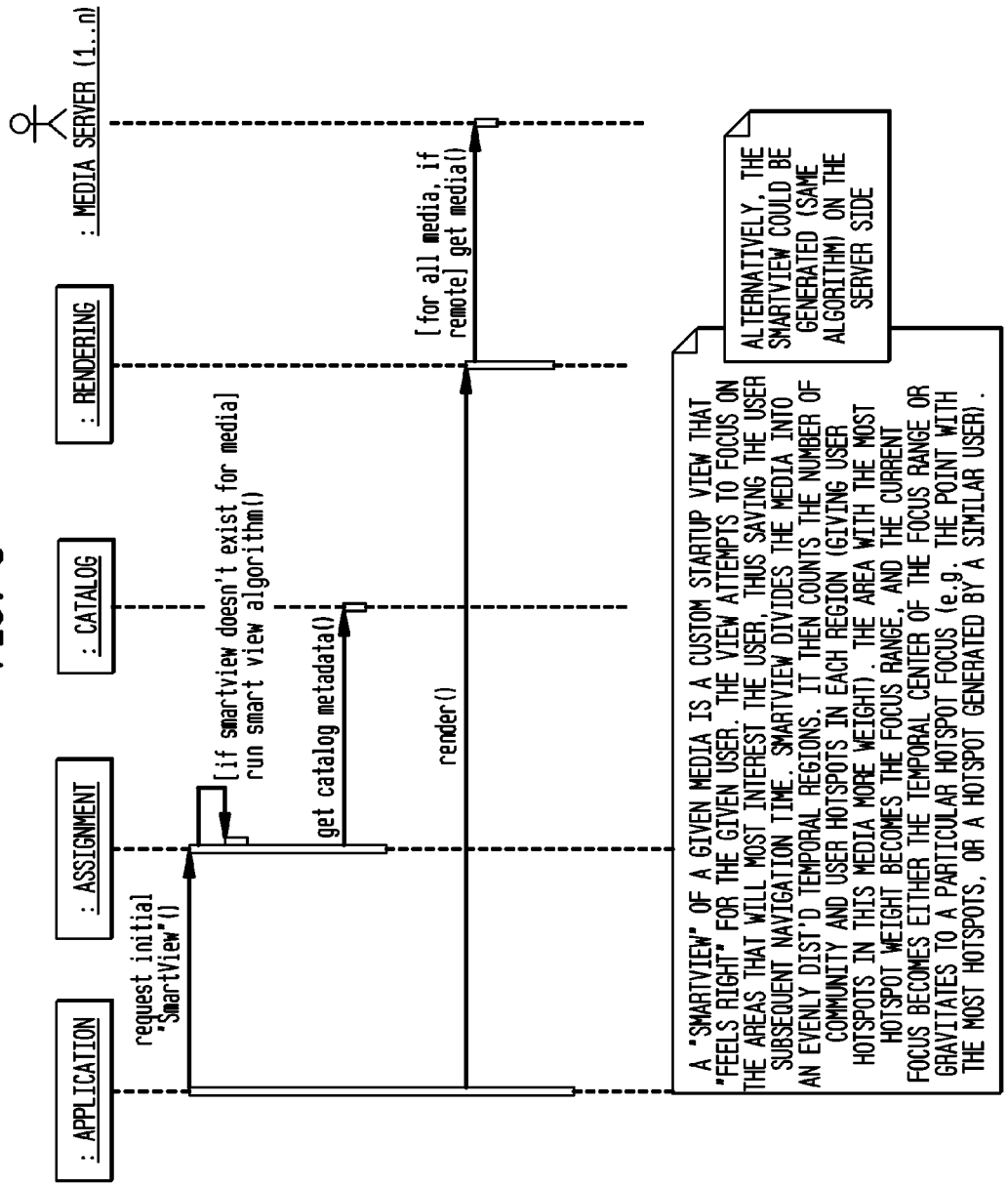
FIG. 9 shows the flow to generate an initial view.

FIG. 9 shows the flow to generate an initial view. Once a user has selected a media, the application generates a default initial view or a "SmartView" of the media. The SmartView is a particular assignment of media segments to parts of the application screen, in which the assignment selection has been tempered to reflect what might have a stronger impact on the user than a "default" view. A "SmartView" of a given media is a custom startup view that "feels right" for the given user. The view attempts to focus on the areas that will most interest the user, thus saving the user subsequent navigation time. SmartView 36 divides the media into n (optionally even) regions. For most temporal media, time is the dimension by which a media can be divided but the system is not limited to only this dimension. SmartView 36 then counts the number of community and user hotspots in each region, optionally giving user hotspots in this media different weight than others. The region with the most hotspot weight becomes the focus range, and the current focus becomes either the temporal center of the focus range or gravitates to a particular hotspot focus, e.g., the point with the most hotspots or a hotspot generated by a similar user. Alternatively, the SmartView could be generated, using the same algorithm or process, on the server side.

The Assignment component 12 of the application may encapsulate the algorithm for creating a SmartView for a given user and a given media, or this algorithm may optionally be stored on and loaded from a remote networked server. Once the assignment is done it is rendered and the user sees this initial view on the mobile device screen. This view can be returned to as necessary by the user during a browsing session through a menu option (e.g., "go back to 'reset' view"). An algorithm for generating the SmartView is:

SmartView Algorithm:

---

Let m be the media
Let u be the user
Let T be the temporal duration of the media
Let t be the number of temporal regions to divide the media into
Let hw be a weighting factor for a user's hotspots
Let cw be a weighting factor for community hotspots
Divide m into t roughly temporal subsections (on average each has temporal duration of
roughly T/t , but subsections may be chosen with any distribution)
For each segment i of m {
    Uh = number of this users' hotspots focussed in this region
    Ch = number of community hotspots focussed in this region
    Seg_score[i] = Uh*hw + Ch+cw
}
Let TR be the region with the highest Seg_score

```
//now generate a smartview focus
If ( the smartview is hotspot agnostic)
    Then Smartview_focus is the temporal center of segment TR
Else ( if smartview is hotspot aware )
    Then Smartview_focus is the focus of one most important hotspot
    from the set of all community and user hotspots focused in TR
//now generate smartview field of view
If ( random range enabled)
    Then Smartview_range = random number bounded by the number
    of temporal units in the segment TR and the number of temporal
    units in the media m
Else if (whole range enabled)
    Then Smartview_range = number of temporal units in media m
Else if (if smartview is hotspot aware)
    Then the Smartview_range is equal to the range of the hotspot
    chosen as the basis for the Smartview_focus
//Finally form the Smartview
Render a smartview with the attributes: focus = Smartview_focus,
and range = Smartview_range
```

Figure 10:
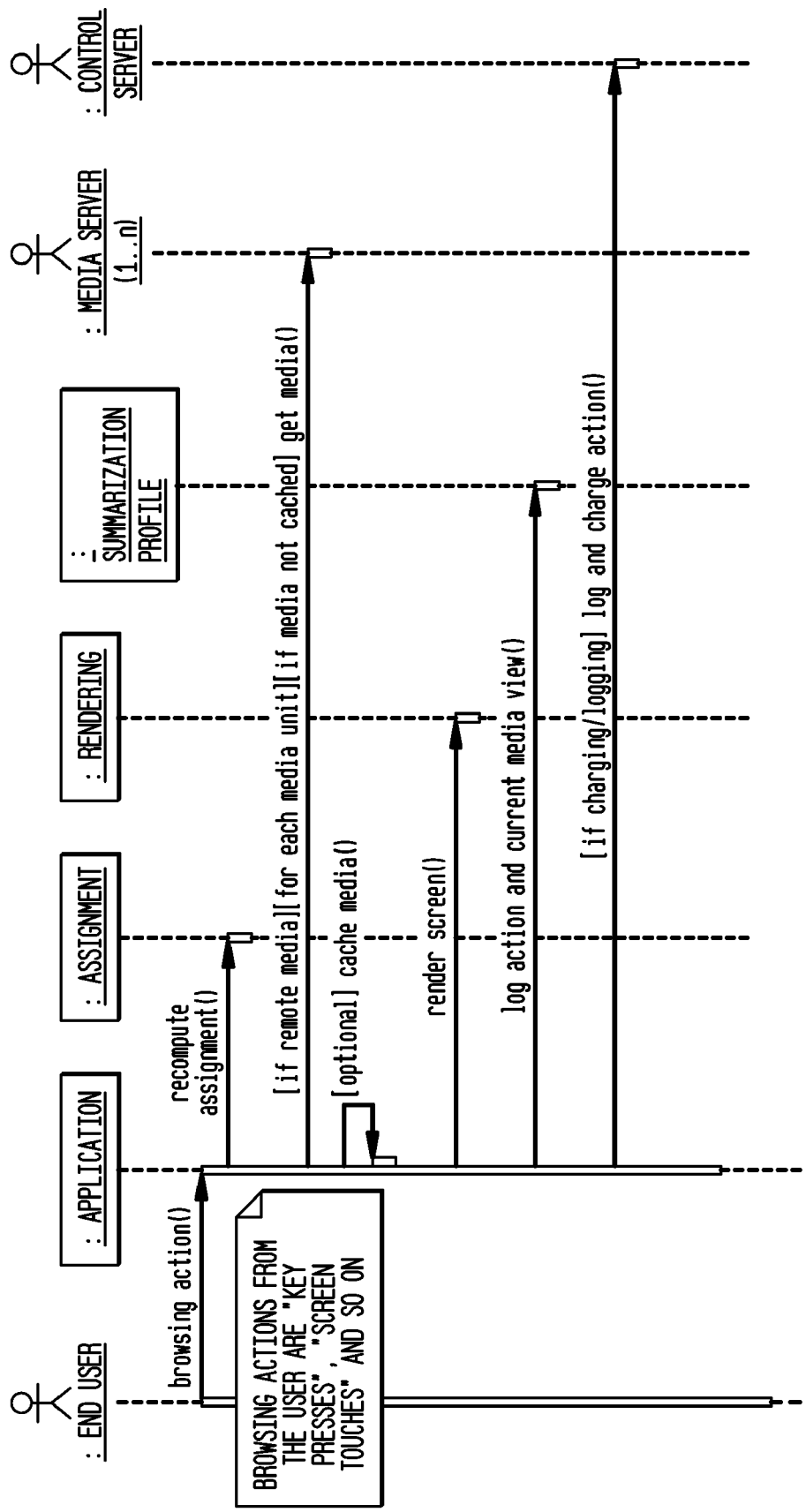
FIG. 10 shows the Browse media use case.

The Browse media use case is shown in FIG. 10. The user proceeds within a browsing session by interacting with the application. At any time, the user may either be choosing to change the view of the current media or interacting with menus to change or select options.

As FIG. 10 shows, when the user interacts to browse, the Assignment module 12 is asked by the main application to reassign the view based upon the input by the user. Browsing actions from the user can include "key presses", "screen touches", and so on, depending on the screen technology. Browsing actions can trigger re-assignment and re-rendering. If media segments required for the new view are remote or if a pre-caching mechanism is enabled, individual media segments may be retrieved from the media server in a single connection transmitting several segments or in several parallel or successive connections to the media server 22. The Rendering component 14 is then asked to paint the screen and does so by using the media segments already in the cache (optional) or by requesting the media from the media server 22. The summarization profile 20 logs the new view and the key presses that led to it, and the application may send this detailed log to a control server 22 for logging and per-click charging purposes.

Figure 11:
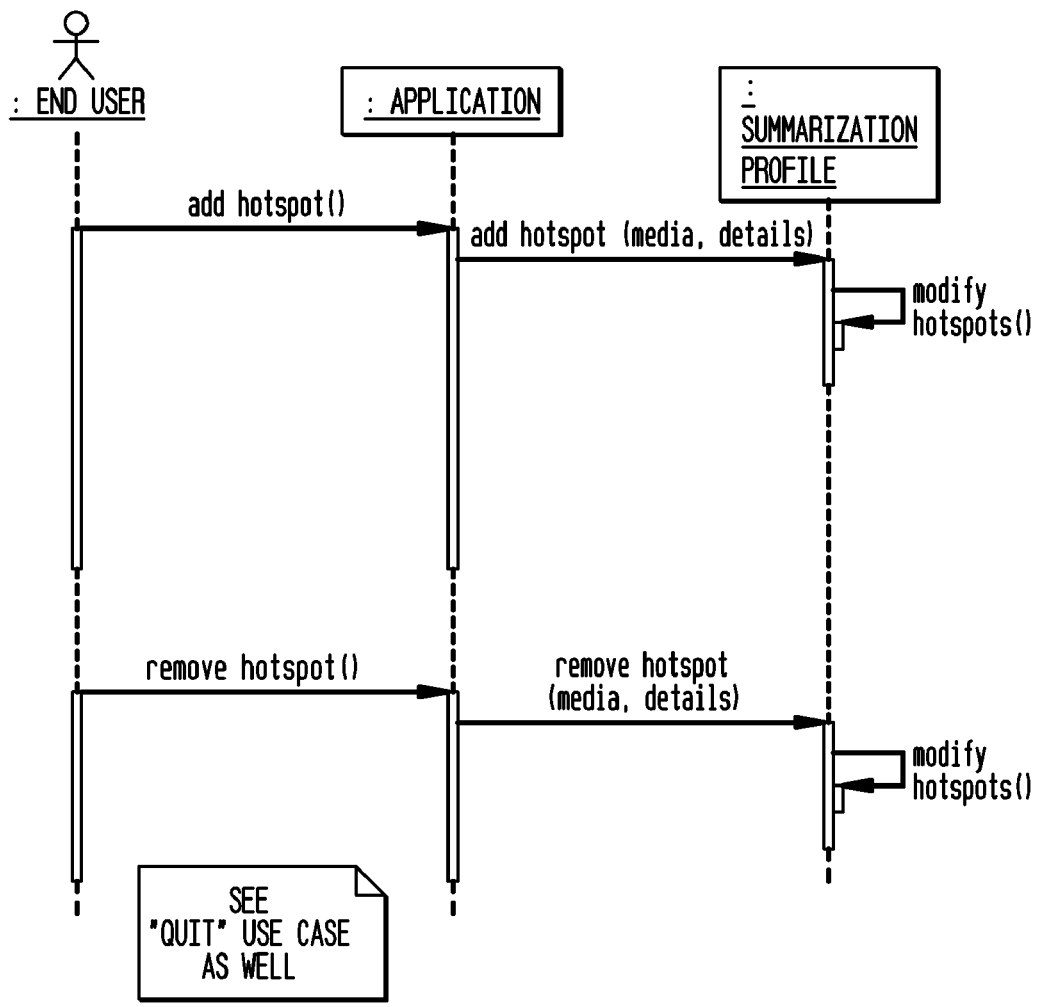
FIG. 11 shows the Browse media and add Hotspot use case.

The Browse media and add Hotspot use case is shown in FIG. 11. At any point during a browse session the user may choose to add an interest "hot spot". The context surrounding the hotspot is passed to the Summarization Profile 20 who stores it. Alternatively, the user may delete an existing hotspot in the media and the Summarization Profile 20 removes it permanently.

In general, a hotspot is a current "view" into the media and is meant to save what the user currently sees for later processing and sharing. What the user sees is generally focused on a given discrete region of the media and has a given discrete range of view. The range of view extends from two media units up to the number of media units available for rendering in the given media. For example, the user might be looking at media unit 52 with a range of 159 around that focus. When the user quits the application other hotspot related operations occur, such as optional syncing with a networked Server.

Figure 12:
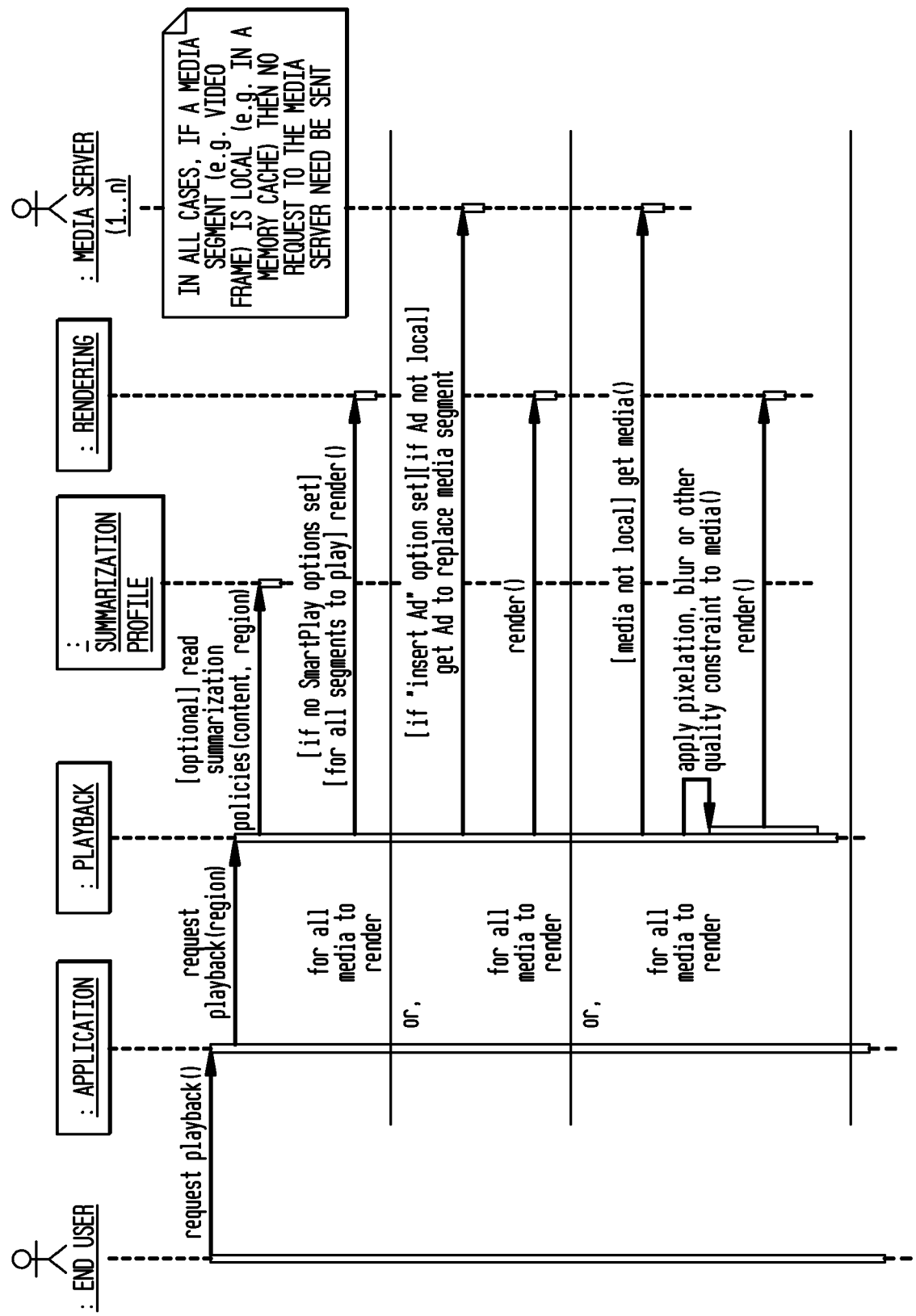
FIG. 12 shows the Playback media use case.

FIG. 12 shows the Playback media use case. During a browsing session, the user may desire a more dynamic "playback"-like experience that corresponds to the current focus and field of view of the tool. In the Playback media use case shown in FIG. 12, the user makes an interaction corresponding to her desire to "playback". The application sends a request to the Playback component 16, indicating the context, e.g., focus, region, of the media. In all cases, if a media segment, e.g., video frame, is local, e.g., in a memory cache, then no request to the media server need be sent.

Optionally, the Playback module 16 may read summarization policies from the Summarization Profile 20 and the Playback module 16 will reconcile the quality of playback desired and allowable for this media and region of the media. In an exemplary embodiment, SmartPlay 38 options include ad insertion, pixelation and other deliberate quality degradation, obfuscation, and blocking.

If no SmartPlay 38 options are enabled and the media segments are not cached, then the Playback module 16 retrieves them from a Media Server 22 and the Rendering component 14 renders them. If an 'insert ads' SmartPlay 38 option is enabled then the Playback module 16 may optionally communicate with a Media Server 22 to retrieve an advertisement icon that should be overlaid on a segment. This can happen on a per segment basis or Playback may load and cache all the ads from the Media Server before playback. Alternatively, ads may be pre-cached locally or remotely. Ads may be chosen to match interests in a user's profile and stored in Summarization Profile 20, or to match the semantics of the media segments being covered up or nearby the insertion point. For example, if a media unit relating to a house is covered by an ad, perhaps the ad is chosen from a Home Repair store. If a 'quality adjust' SmartPlay option is enabled, then, on a per-frame or per-segment basis, before passing the cached or loaded media for rendering, it will be blurred, pixelated, or otherwise reduced in quality to match the policies and constraints of the media and/or user, e.g., user might not be allowed to view a particular segment in high-quality. The Playback component 16 may choose to block the segments from view completely, e.g., by replacing them with a "not allowed" icon instead of blurring them.

Playback options may be modified during playback dynamically via a declaration of summarization changes from the media server. When these are received by the Playback module 16 they are updated by the Summarization Profile module 20 and the new policies take effect immediately. Such changes may be transmitted via the media server to the Application over the same channel as the media segments or over a different communications channel.

As an example, user X is browsing and playing back media M, but M is pixelated according to X's rights on this media. Meanwhile on some other device, X's partner Y acquires new rights on X's behalf and, once finalized, the Media Server 22 sends the new rights as in the below use case. The result is that X's playback becomes un-pixelated for the media, for this session and all subsequent sessions of media M.

Figure 13:
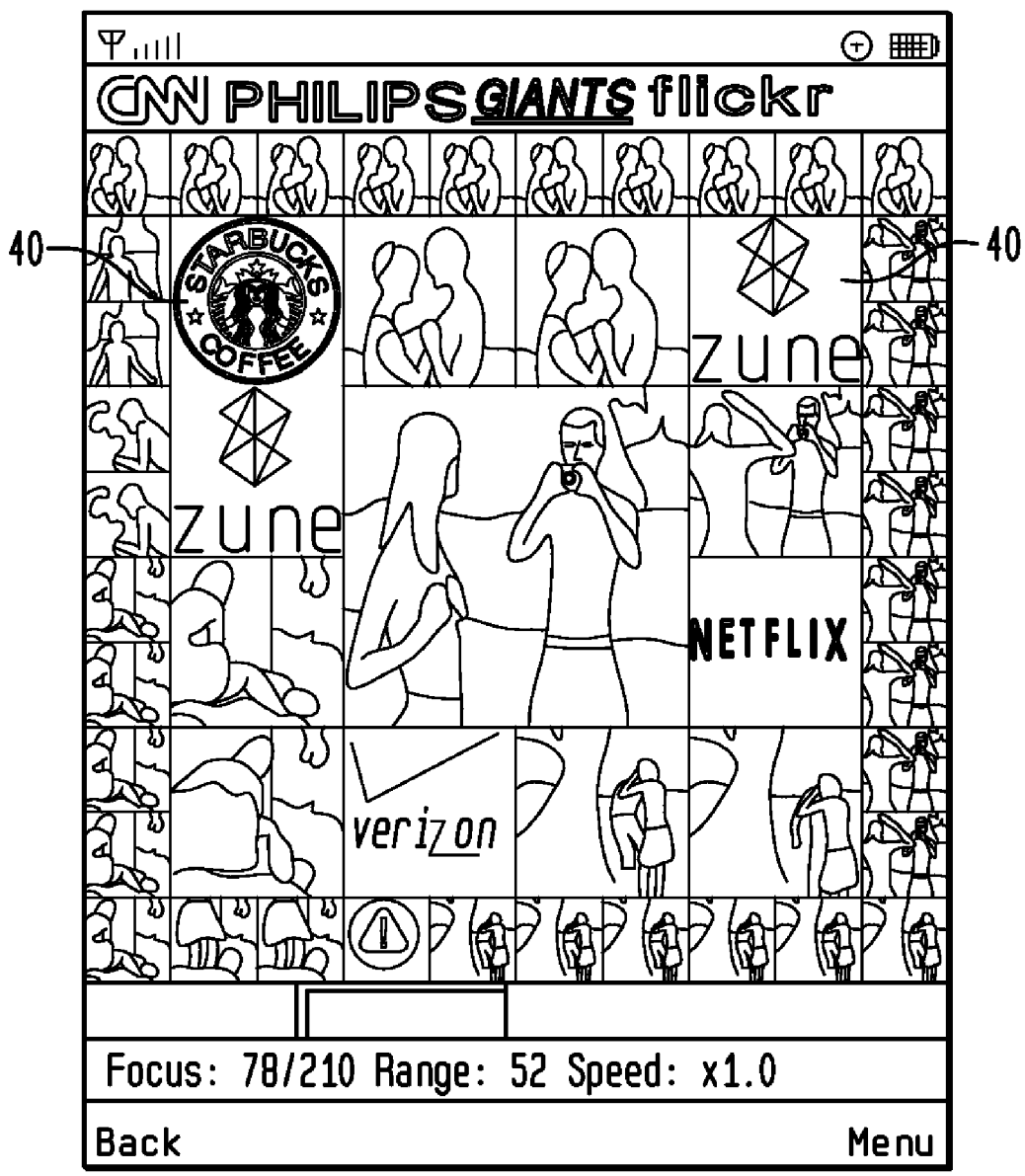
FIG. 13 illustrates some playback and browsing features.
Figure 14:
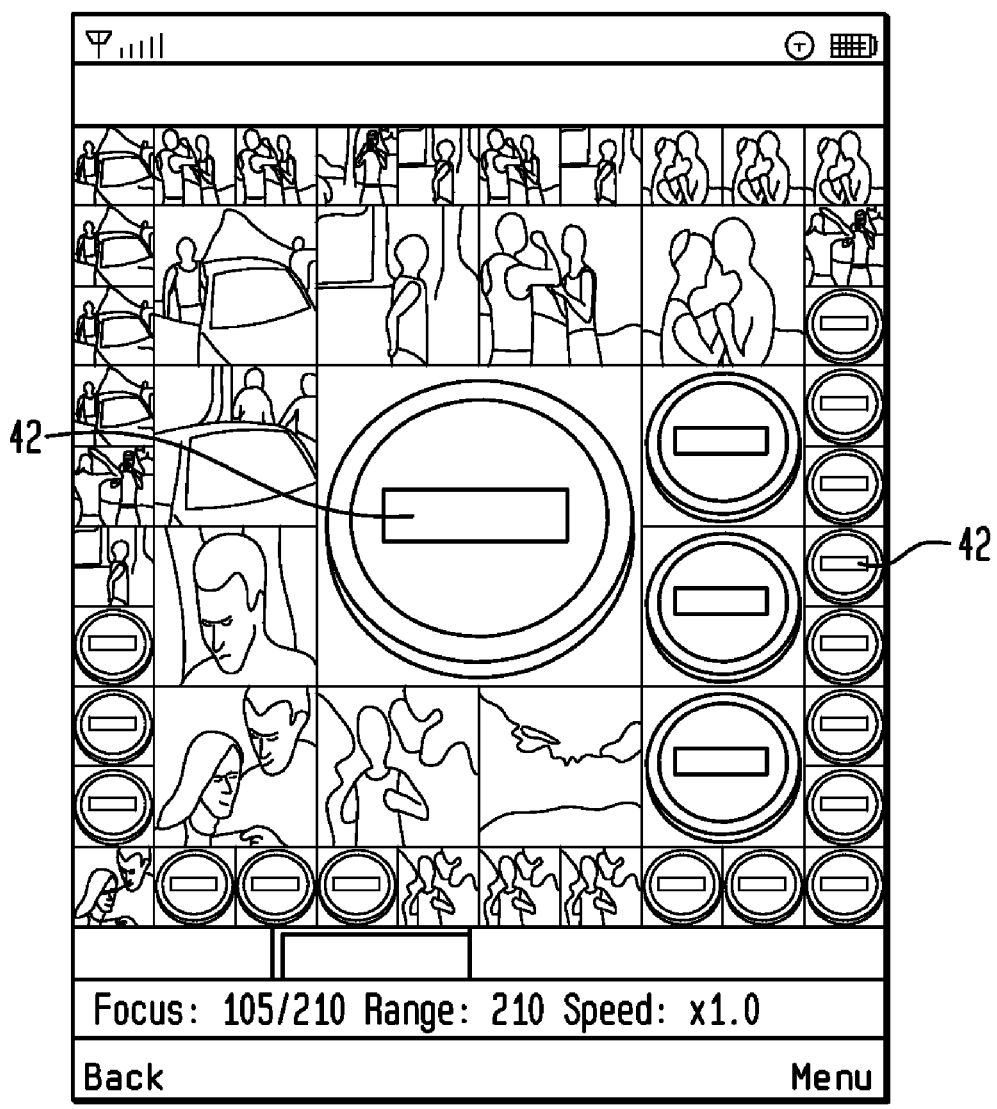
FIG. 14 illustrates additional playback and browsing features.
Figure 15:
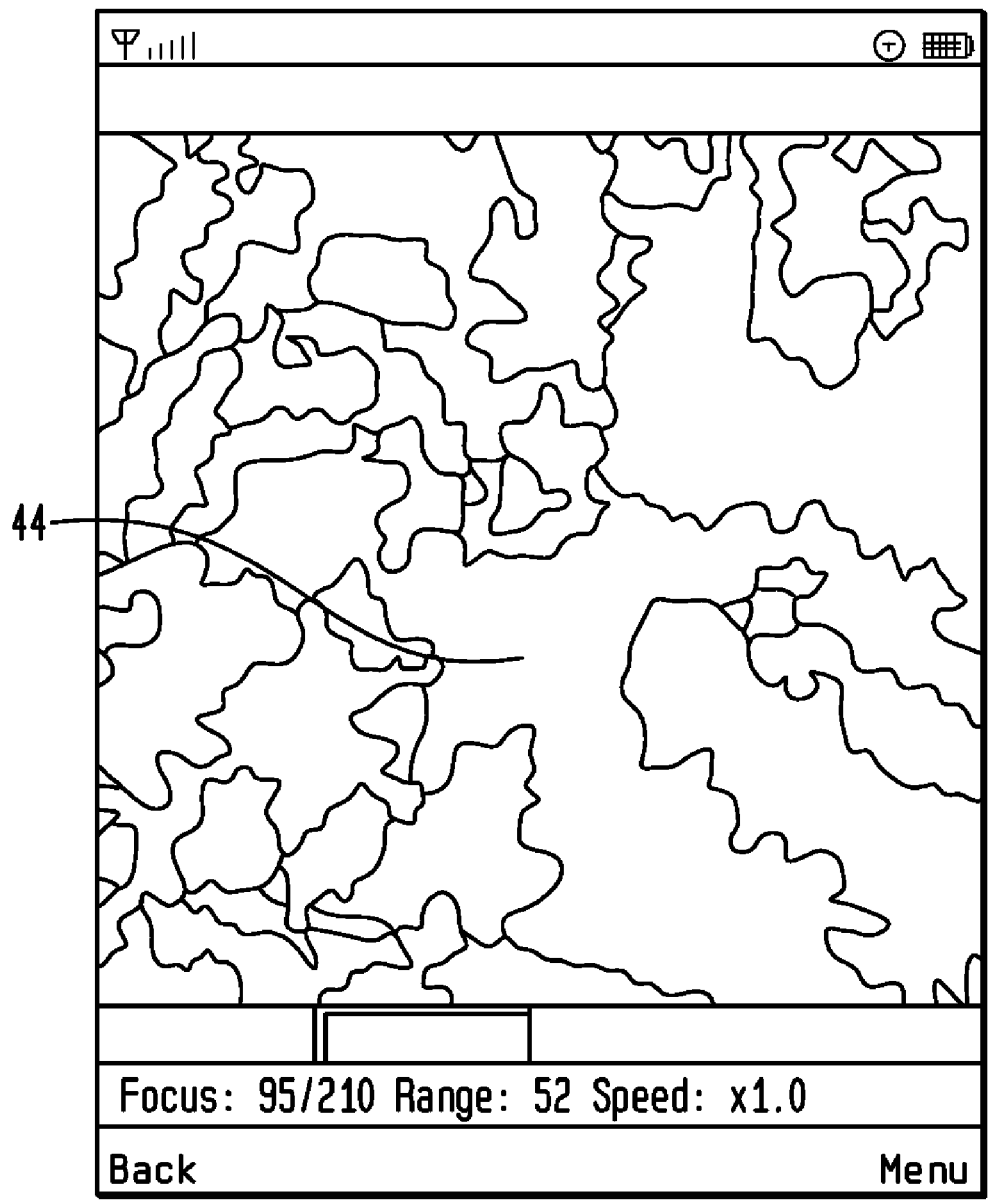
FIG. 15 illustrates more playback and browsing features.

FIGS. 13-15 illustrate playback and browsing features that include ad insertion 40, parental control 42, e.g., media segment blocking out, and playback pixelization 44. FIG. 13 shows browsing and/or playback with Rendering component 14 inserting advertisement segments 40 at particular temporal locations. FIG. 14 shows browsing and/or playback with scene blocking 42. Segments are completely blocked by a "not allowed" icon 42. FIG. 15 shows pixelization of playback 44 to further obfuscate content and to preserve original content integrity.

Figure 16:
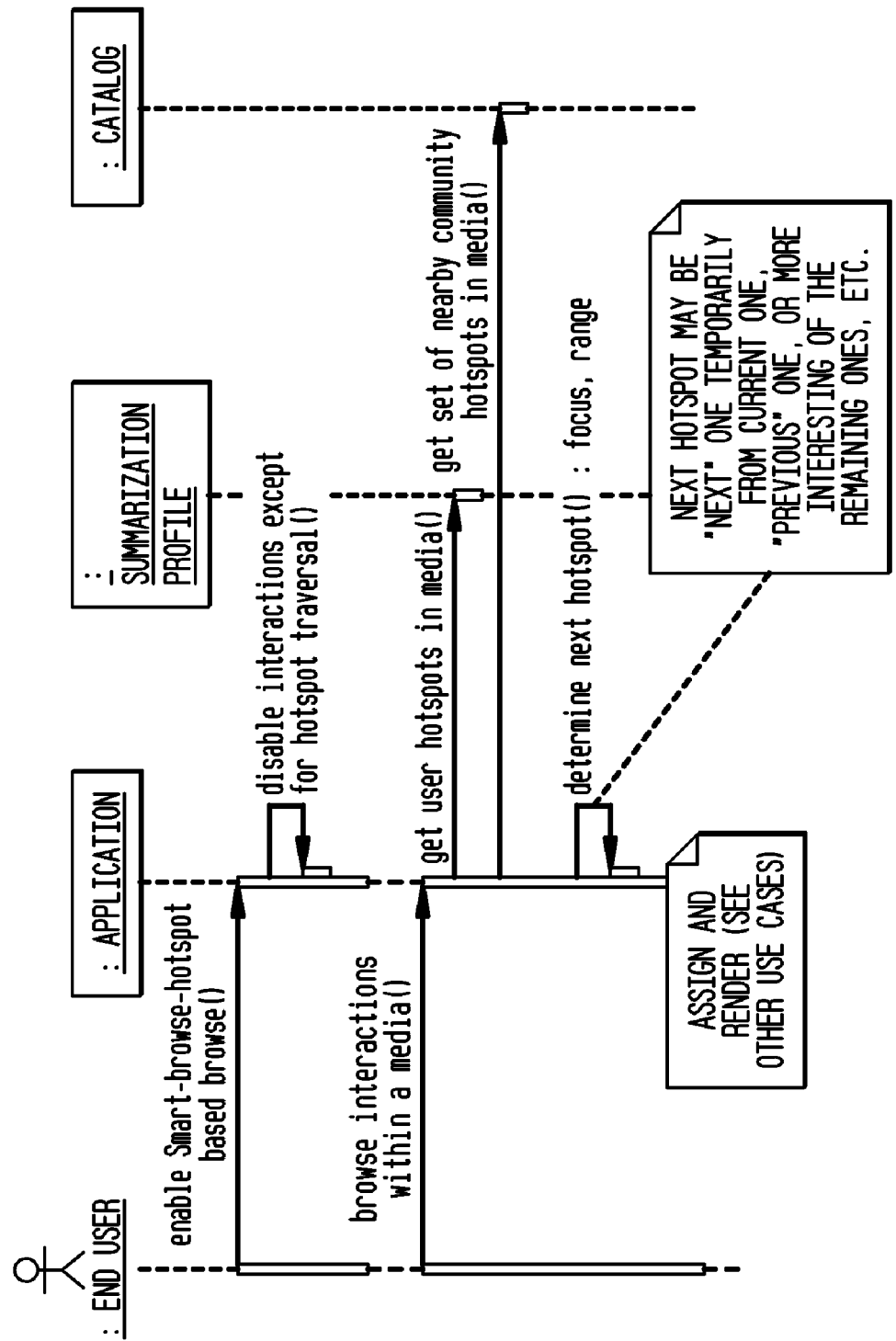
FIG. 16 shows another hotspot browsing use case.

A different hotspot browsing use case is shown in FIG. 16. At any time the user may indicate she wishes to browse in the "locked hotspot based browsing" mode. Once selected as an option, the application disables all interactive features of browsing except for those that are used to switch between hotspots, that is, NEXT (including if at last, toggle to first), and PREVIOUS (including if at first, toggle to last), and those features needed to 'cancel' this mode of browsing. When the user chooses to traverse to either the next or the previous hotspot, the Summarization Profile module is asked for this user's hotspots in this media. The Catalog 18 may be queried for the set of community hotspots in this media. The Application then determines which hotspot to traverse to next and asks the Assignment 12 and Rendering 14 modules to perform as per the next hotspot context (e.g. its focus and range). Typically, hotspots are ordered on the time dimension and so given a hotspot, the 'next' and 'previous' can be easily computed. Other dimensions, however, could be used, such as 'next most important', or 'next most colorful'.

One algorithm the Application 10 can use to determine a hotspot to jump to upon user interaction is:

Let U be set of this users hotspots in this media (each hotspot has a focus and field of view).

Let C be the set of community hotspots in this media (each hotspot has a focus and field of view)

Let t be the temporal place currently displayed in the current hotspot

If (next hotspot action chosen)

Then find the hotspot from U or C whose focus is greater than the current focus and is closest to the current focus.

If (previous hotspot action chosen)

Then find the hotspot from U or C whose focus is less than the current focus and is closest to the current focus.

If no such hotspot has been selected, show a message to the user or toggle to another one in sequence.

Change the view to the selected hotspot's focus and field of view.

Figure 17:
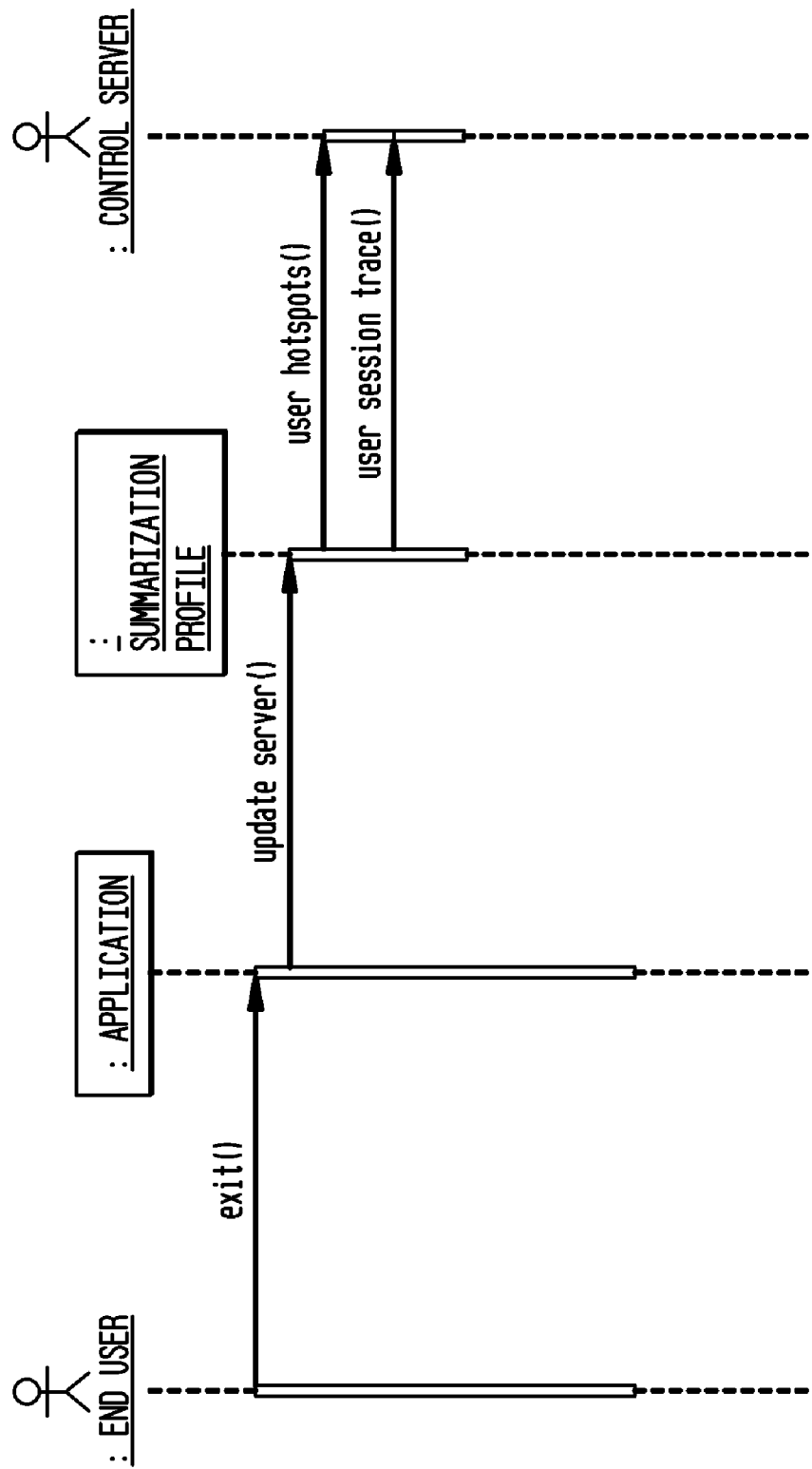
FIG. 17 shows the quit use case.

The quit use case is shown in FIG. 17. The user interacts with Application 10 to indicate she wants to end a browsing session. The Application 10 asks the Summarization Profile module 20 to update the server. In response, Summarization Profile uses a network connection to an API of the Control Server 22 and sends all updated hotspots the user has created in this session, and all user browsing traces, to the Control Server 22. These browsing traces can include the names of media browsed, and the full browse trace from this session including the individual clicks identifying which segments were clicked on for zoom in, zoom out, pan operations, playback, time spent on each "view", and other metrics relating to user's browse behavior.

Figure 18:
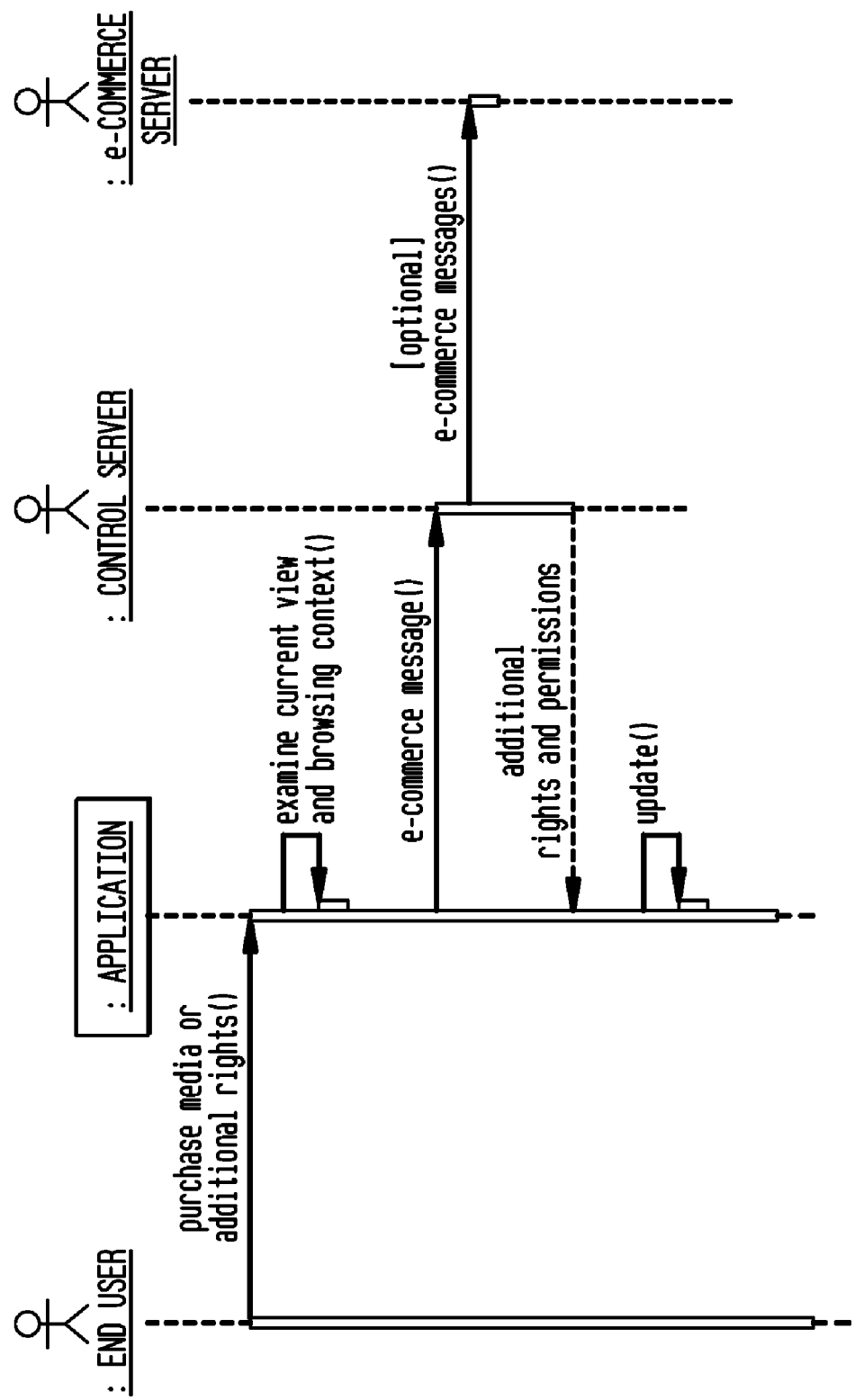
FIG. 18 shows an e-commerce use case.

An e-commerce use case is shown in FIG. 18. A given user may use the Application 10 to indicate that she would like to either purchase the media being browsed—in whole or in part—or to purchase the rights to additional browsing capabilities such as improved resolution, improved overall quality, less pixelation of content, fewer advertisements, more advertisements meeting certain criteria, less or no blocked media segments, and so on.

The user triggers this directly through the application by selecting menu options. Alternatively, the system might allow a policy to be setup so that when particular thresholds are met then e-commerce applications are automatically triggered. One example would be "if the user browses the media for more than 5 minutes or views more than 100 views of the media then automatically purchase it for her and notify her".

Control Server 22 receives the e-commerce request and optionally forwards it to a local or partnered e-commerce server. The Control server responds to the Application 10 with data that comprises any new capabilities or constraints. The Application makes local updates to components and the browsing session experiences the new capabilities immediately. Alternatively, the user might have to restart the session to experience the new capabilities.

Figure 19:
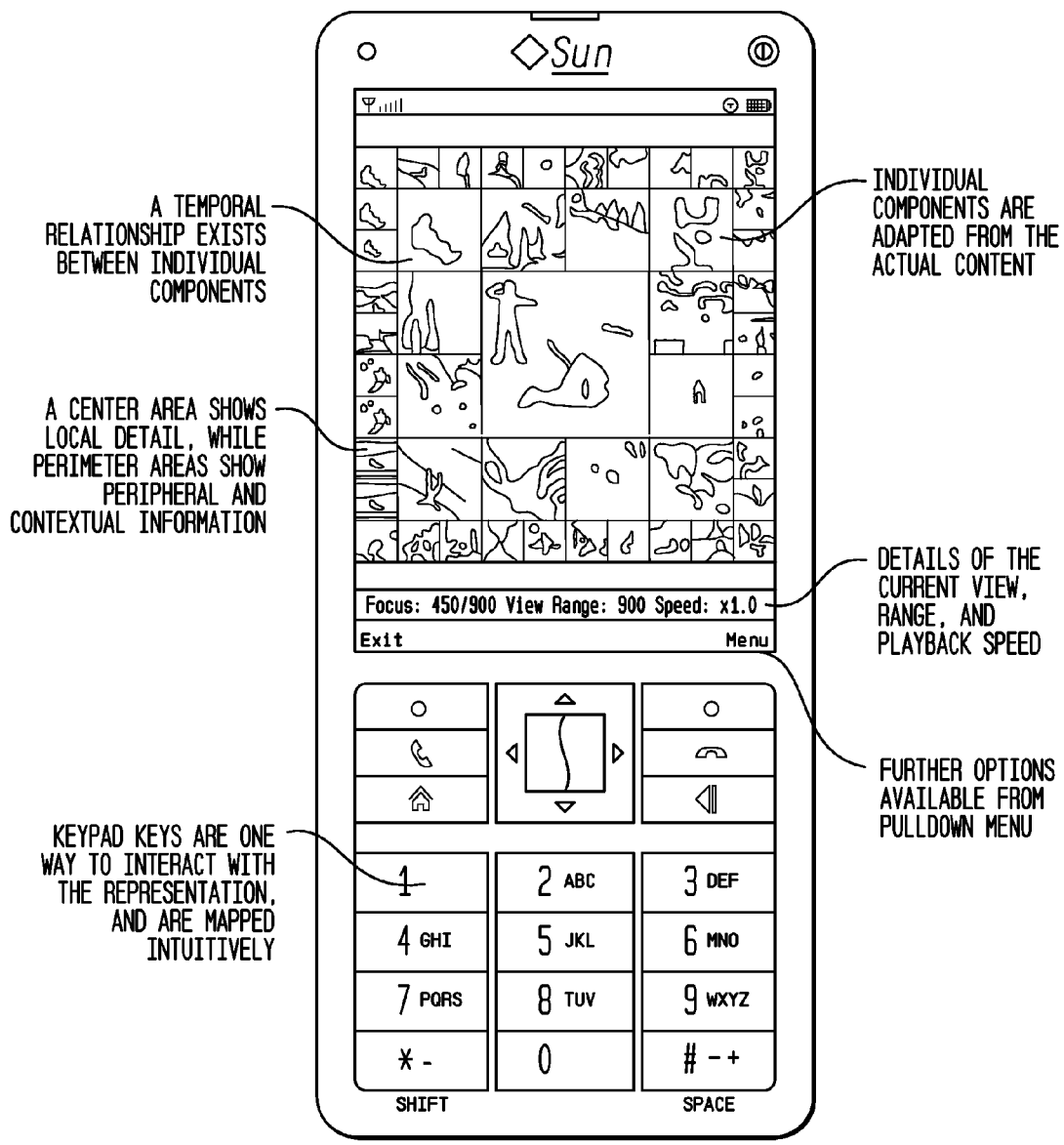
FIG. 19 depicts a typical YouTube video as represented in one embodiment of the invention system.
Figure 20:
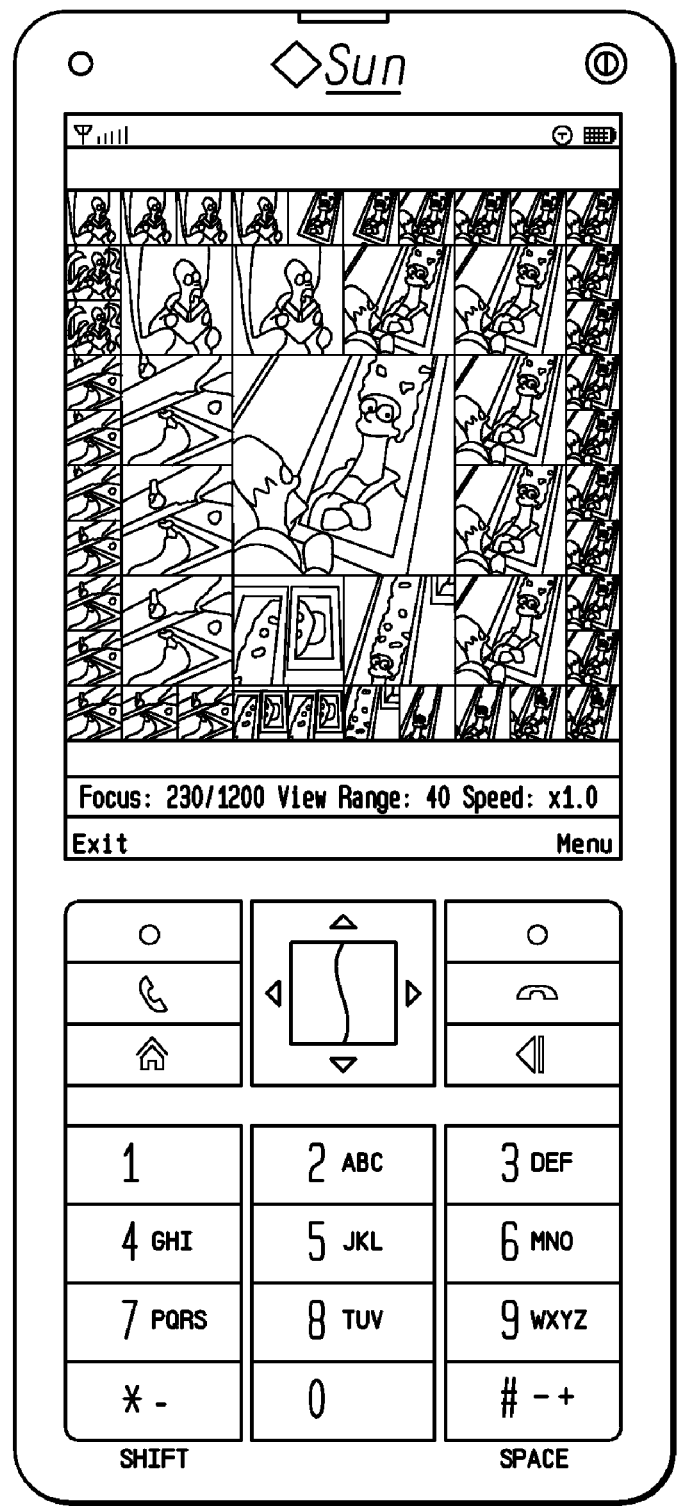
FIG. 20 depicts a tool that has been used to "zoom into" video content for further understanding.

Visually, the inventive tool might render media onto the screen in any number of ways, however those that convey the notions of media focus and range at any and every rendering pattern are preferred. FIGS. 19 and 20 depict an embodiment of the invention interacting with a typical YouTube video. As shown in FIGS. 19 and 20, the Application 10 presents a central key area in the screen's center, surrounded by one or more outer "rings". In this embodiment, the proportions of the components are similar to the video content, e.g., square or rectangular. However, in general the components could take any effective "shape", such as circular, oval, etc., and either the Rendering component 14 or the Media server 22 may be capable of converting the media segment between formats and proportions.

FIG. 19 points out various features that result from Rendering in this embodiment. As shown in FIG. 19, individual components are adapted from the actual content. Details of the current view, range, and playback speed appear on the lower portion of the screen of the mobile device, and further options are available from pull down menus accessible from the lower portion of the screen.

The entire tiled view is interactive. Keypad keys are one way in which to interact with the representation, and are mapped intuitively. However, any input mechanism in which a user indicates areas of interest on the visual rendered part of the browsing interface are valid (e.g. touch screen, keypad, stylus, etc.).

For example, when using a keypad, the keys are mapped as follows. Clicks upon individual keyframe tiles result in a refocusing of the representation on the new region of the video using the selected segments as the new focus. Special clicks are possible, such as keypad "5" (clicking on the focus frame) which corresponds to a zoom function, that is, reducing the current range of view by some factor, e.g., by a factor of two or in half. Another click increases the current range of view. Thus, browsing both temporally (forwards/backwards) and zooming up and down into detail (showing more or fewer frames per time period) are easy and quick. The Application 10 allows for the instantaneous playback of any region of the media including: a) just the range currently being examined, b) the whole media, c) play all segments at once.

Several features of the browsing tool are user-configurable, including the number of rings (an important visualization tradeoff). The ring options are: a) No rings around the focus which takes up the entire screen (this is the default "playback" configuration), b) One ring around the focus, c) Two rings around the focus (e.g. allows fine grain view of content and meta-content (e.g. scenes)), d) Three or more rings. Computationally, the tool's main concerns are: assignment of media fragments to screen regions, rendering of the interface accounting for screen size, and managing segment playback.

FIG. 20 depicts a smartphone in accordance with the Application 10 that has been used to "zoom into" video content for further understanding. Note that when the "View Range" becomes small, more granularity can be understood from the surrounding context, e.g., we can now see roughly the action that comprises a whole scene.

Figure 21:
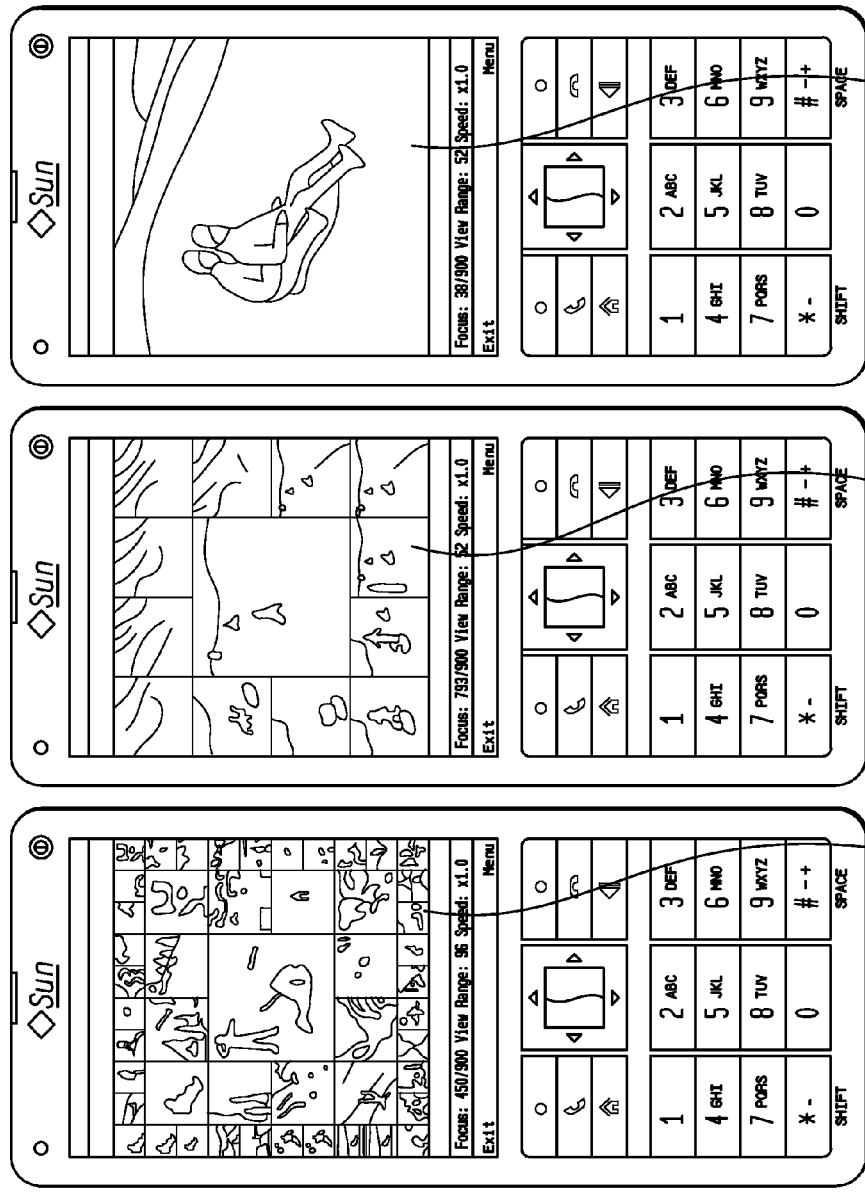
FIG. 21 depicts a varying degree of peripheral information that can be displayed.

FIG. 21 depicts a varying degree of peripheral information that can be displayed in one embodiment. The mobile device or smartphone on the right shows no peripheral information; only the focus area is displayed. The smartphone in the center displays a moderate amount of peripheral information; the focus area is larger and in the center of the display. The left-most smartphone displays more peripheral information at the expense of slight decrease in local detail.

In the above embodiment shown in FIGS. 19-21 the content in question is video, but it could be audio, image, or any other data, with or without a temporal dimension.

Figure 22:
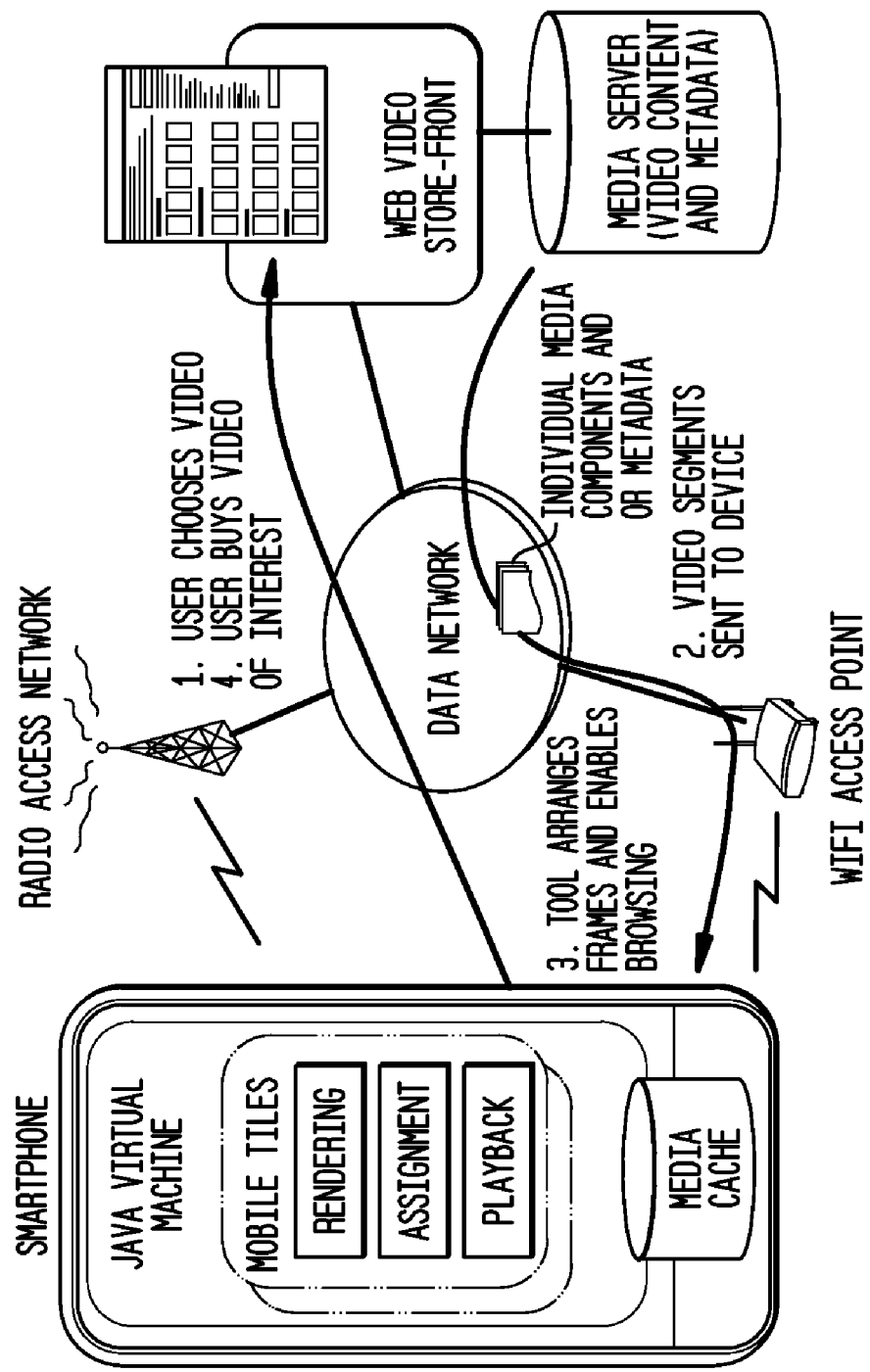
FIG. 22 depicts an Ecosystem 1 and related components.
Figure 23:
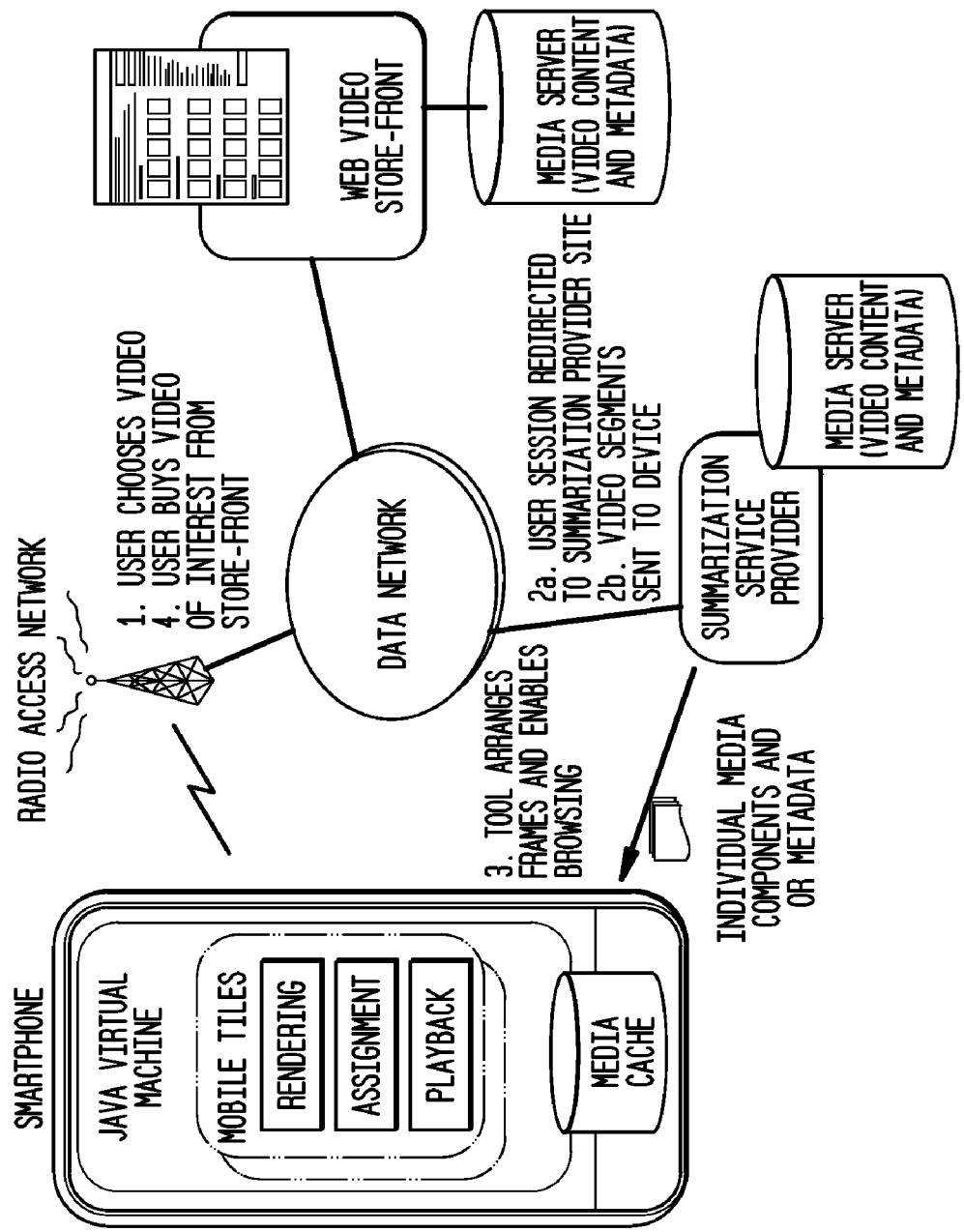
FIG. 23 depicts an Ecosystem 2 and related components.

FIGS. 22 and 23 depict two Ecosystems and their related components. FIG. 22 shows an Ecosystem in which Summarization is provided by store-front or repository site. The Ecosystem comprises a smartphone hosting the Application 10, a data network, web video store-front with Media Server, WiFi access points, and radio access network. The operation of this Ecosystem includes the following. Using the data network, a user chooses a video from the web video store-front. The video and metadata is retrieved from the Media Server, and sent to the user's device. The Application 10 arranges the video and enables browsing of it. The user chooses to buy the video of interest and purchases same from the web video store-front. The Application conveys the appropriate metadata to the store to identify the video in question.

FIG. 23 shows another Ecosystem in which Summarization is provided by a third party. This Ecosystem comprises a Service Provider hosting the Media Server in addition to the items in the above Ecosystem. The operation of this Ecosystem is similar to that of the Ecosystem shown in FIG. 22 with slight modification. When the user chooses a video, if the web video store-front does not have this video, it is retrieved from a Summarization Provider site to which the user is directed. The Summarization Provider sends video segments, such as individual media segments and/or metadata, to the user's smartphone. As with FIG. 22, the Application arranges the video and enables browsing, and the user can buy the video of interest from the web video store-front.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for generating and presenting summarization of mobile content having a plurality of media segments, comprising:
    an application on a mobile device having a screen;
    an assignment module assigning one or more of said media segments to one or more parts of said screen wherein implicit and explicit interests of a user are logged, shared, aggregated, and used by the assignment module as a basis for assigning one or more of said media segments to one or more parts of said screen;
    a rendering module rendering said assigned media segments on said parts of said screen;
    a playback module playing back said assigned media segments in various qualities wherein said various qualities include obfuscating, blocking, and replacing media segments based on attributes and policy and wherein the playing back further comprises obfuscating the media segments based on attributes or replacing media segments with others for the purposes of targeted advertisement;
    a catalog module representing media metadata about the mobile content;
    a summarization module stewarding the media metadata; and
    a remote server storing said mobile content and the media metadata, wherein the application retrieves the mobile content from the remote server and accesses the assignment module, the rendering module, the playback module, the catalog module and the summarization module.

2. The system according to claim 1, further comprising a control server storing rules and business logic.

3. The system according to claim 1, wherein the application retrieves the mobile content using a data network.

4. The system according to claim 1, wherein the summarization module encodes constraints and media browsing limitations imposed on a user.

5. The system according to claim 1, wherein a dynamically generated and customized static view of various media provides a means for comparison of the various media.

6. The system according to claim 1, wherein said rendering module renders said assigned media segments based on a dynamically changing notion of range of view and focus.

7. A computer readable medium having computer readable program for operating on a computer for generating and presenting summarization of mobile content having media components, said program comprising instructions that cause the computer to perform the steps of:
    storing, on a remote server, the mobile content and media metadata;
    retrieving, using an application on a mobile device having a screen, the mobile content from the remote server;
    assigning one or more of said media segments to one or more parts of said screen, wherein implicit and explicit interests of a user are logged, shared, aggregated, and used by an assignment module as a basis for assigning one or more of said media segments to one or more parts of said screen;
    rendering said assigned media segments on said parts of said screen;
    playing back said assigned media segments in various qualities, wherein said various qualities include obfuscating, blocking, and replacing media segments based on attributes and policy, and wherein the step of playing back further comprises obfuscating the media segments based on attributes or replacing media segments with others for the purposes of targeted advertisement;

representing media metadata about the mobile content; and stewarding the media metadata.

8. The computer readable medium according to claim 7, further comprising a step of storing rules and business logic.

9. The computer readable medium according to claim 7, wherein the step of retrieving is performed using a data network.

10. The computer readable medium according to claim 7, wherein the step of stewarding further comprises encoding constraints and media browsing limitations imposed on a user.

11. The computer readable medium according to claim 7, wherein said step of rendering said assigned media segments is performed based on a dynamically changing notion of range of view and focus.

12. A method for generating and presenting summarization of mobile content having media components, said program comprising instructions that cause the computer to perform the steps of:

storing, on a remote server, the mobile content and media metadata;

retrieving, using an application on a mobile device having a screen, the mobile content from the remote server;

assigning one or more of said media segments to one or more parts of said screen, wherein implicit and explicit interests of a user are logged, shared, aggregated, and used by an assignment module as a basis for assigning one or more of said media segments to one or more parts of said screen;

rendering said assigned media segments on said parts of said screen;

playing back said assigned media segments in various qualities wherein said various qualities include obfuscating, blocking, and replacing media segments based on attributes and policy and wherein the step of playing back further comprises obfuscating the media segments based on attributes or replacing media segments with others for the purposes of targeted advertisement;

representing media metadata about the mobile content; and stewarding the media metadata.

13. The method according to claim 12, further comprising a step of storing rules and business logic.

14. The method according to claim 12, wherein the step of retrieving is performed using a data network.

15. The method according to claim 12, wherein the step of stewarding further comprises encoding constraints and media browsing limitations imposed on a user.

16. The method according to claim 12, wherein said step of rendering said assigned media segments is performed based on a dynamically changing notion of range of view and focus.

* * * * *